(12) United States Patent
Ko et al.

(10) Patent No.: US 11,921,561 B2
(45) Date of Patent: *Mar. 5, 2024

(54) NEURAL NETWORK INFERENCE CIRCUIT EMPLOYING DYNAMIC MEMORY SLEEP

(71) Applicant: Perceive Corporation, San Jose, CA (US)

(72) Inventors: Jung Ko, San Jose, CA (US); Kenneth Duong, San Jose, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,625

(22) Filed: May 27, 2022

(65) Prior Publication Data
US 2022/0291739 A1 Sep. 15, 2022

Related U.S. Application Data

(63) Continuation of application No. 16/427,302, filed on May 30, 2019, now Pat. No. 11,347,297.
(Continued)

(51) Int. Cl.
*G06F 1/32* (2019.01)
*G06F 1/3287* (2019.01)

(52) U.S. Cl.
CPC ................... *G06F 1/3287* (2013.01)

(58) Field of Classification Search
CPC .................................................. G06F 1/3287
See application file for complete search history.

(56) References Cited

U.S. PATENT DOCUMENTS 5,956,703 A 9/1999 Turner et al.
9,710,265 B1 7/2017 Temam et al.
(Continued)

FOREIGN PATENT DOCUMENTS

CN 108876698 A 11/2018
CN 108280514 B 10/2020
(Continued)

OTHER PUBLICATIONS

Liu, Shaoli, et al., "Cambricon: An Instruction Set Architecture for Neural Networks," 2016 ACM/IEEE 43rd Annual International Symposium on Computer Architecture, Jun. 18-22, 2016, 13 pages, IEEE, Seoul, South Korea.
(Continued)

*Primary Examiner* — Stefan Stoynov
(74) *Attorney, Agent, or Firm* — ADELI LLP

(57) ABSTRACT

For a neural network inference circuit that executes a neural network including multiple computation nodes at multiple layers for which data is stored in a plurality of memory banks, some embodiments provide a method for dynamically putting memory banks into a sleep mode of operation to conserve power. The method tracks the accesses to individual memory banks and, if a certain number of clock cycles elapse with no access to a particular memory bank, sends a signal to the memory bank indicating that it should operate in a sleep mode. Circuit components involved in dynamic memory sleep, in some embodiments, include a core RAM pipeline, a core RAM sleep controller, a set of core RAM bank select decoders, and a set of core RAM memory bank wrappers.

20 Claims, 17 Drawing Sheets

Related U.S. Application Data

(60) Provisional application No. 62/798,364, filed on Jan. 29, 2019, provisional application No. 62/796,029, filed on Jan. 23, 2019.

(56) References Cited

U.S. PATENT DOCUMENTS

| | | |
|---|---|---|
| 9,858,636 B1 | 1/2018 | Lim et al. |
| 10,445,638 B1 | 10/2019 | Amirineni et al. |
| 10,489,478 B2 | 11/2019 | Lim et al. |
| 10,515,303 B2 | 12/2019 | Lie et al. |
| 10,657,438 B2 | 5/2020 | Lie et al. |
| 10,768,856 B1 | 9/2020 | Diamant et al. |
| 10,796,198 B2 | 10/2020 | Franca-Neto |
| 10,817,042 B2 | 10/2020 | Desai et al. |
| 10,853,738 B1 | 12/2020 | Dockendorf et al. |
| 11,138,292 B1 | 10/2021 | Nair et al. |
| 11,347,297 B1 | 5/2022 | Ko et al. |
| 11,423,289 B2 | 8/2022 | Judd et al. |
| 2004/0078403 A1 | 4/2004 | Scheuermann et al. |
| 2005/0210206 A1* | 9/2005 | Woodbridge ....... G06F 12/0215 711/E12.004 |
| 2016/0086078 A1 | 3/2016 | Ji et al. |
| 2016/0342893 A1 | 11/2016 | Ross et al. |
| 2017/0011006 A1 | 1/2017 | Saber et al. |
| 2017/0011288 A1 | 1/2017 | Brothers et al. |
| 2017/0243110 A1 | 8/2017 | Esquivel et al. |
| 2017/0323196 A1 | 11/2017 | Gibson et al. |
| 2018/0018559 A1 | 1/2018 | Yakopcic et al. |
| 2018/0046458 A1 | 2/2018 | Kuramoto |
| 2018/0046905 A1 | 2/2018 | Li et al. |
| 2018/0046916 A1 | 2/2018 | Dally et al. |
| 2018/0101763 A1 | 4/2018 | Barnard et al. |
| 2018/0114569 A1 | 4/2018 | Strachan et al. |
| 2018/0121196 A1 | 5/2018 | Temam et al. |
| 2018/0121796 A1 | 5/2018 | Deisher et al. |
| 2018/0164866 A1 | 6/2018 | Turakhia et al. |
| 2018/0181406 A1 | 6/2018 | Kuramoto |
| 2018/0189229 A1 | 7/2018 | Desoli et al. |
| 2018/0189638 A1 | 7/2018 | Nurvitadhi et al. |
| 2018/0197068 A1 | 7/2018 | Narayanaswami et al. |
| 2018/0246855 A1 | 8/2018 | Redfern et al. |
| 2018/0285719 A1 | 10/2018 | Baum et al. |
| 2018/0285726 A1 | 10/2018 | Baum et al. |
| 2018/0285727 A1 | 10/2018 | Baum et al. |
| 2018/0285736 A1 | 10/2018 | Baum et al. |
| 2018/0293493 A1 | 10/2018 | Kalamkar et al. |
| 2018/0293691 A1 | 10/2018 | Nurvitadhi et al. |
| 2018/0300600 A1 | 10/2018 | Ma et al. |
| 2018/0307494 A1 | 10/2018 | Ould-Ahmed-Vall et al. |
| 2018/0307950 A1 | 10/2018 | Nealis et al. |
| 2018/0307980 A1 | 10/2018 | Barik et al. |
| 2018/0307985 A1 | 10/2018 | Appu et al. |
| 2018/0314492 A1 | 11/2018 | Fais et al. |
| 2018/0314941 A1 | 11/2018 | Lie et al. |
| 2018/0315158 A1 | 11/2018 | Nurvitadhi et al. |
| 2018/0322387 A1 | 11/2018 | Sridharan et al. |
| 2018/0365794 A1 | 12/2018 | Lee et al. |
| 2019/0026078 A1 | 1/2019 | Bannon et al. |
| 2019/0026237 A1 | 1/2019 | Talpes et al. |
| 2019/0041961 A1 | 2/2019 | Desai et al. |
| 2019/0073585 A1* | 3/2019 | Pu ..................... G06F 1/3287 |
| 2019/0095776 A1 | 3/2019 | Kfir et al. |
| 2019/0114499 A1 | 4/2019 | Delaye et al. |
| 2019/0138891 A1 | 5/2019 | Kim et al. |
| 2019/0147338 A1 | 5/2019 | Pau et al. |
| 2019/0156180 A1 | 5/2019 | Nomura et al. |
| 2019/0171927 A1 | 6/2019 | Diril et al. |
| 2019/0179635 A1 | 6/2019 | Jiao et al. |
| 2019/0180167 A1 | 6/2019 | Huang et al. |
| 2019/0187983 A1 | 6/2019 | Ovsiannikov et al. |
| 2019/0205094 A1 | 7/2019 | Diril et al. |
| 2019/0205358 A1 | 7/2019 | Diril et al. |
| 2019/0205736 A1 | 7/2019 | Bleiweiss et al. |
| 2019/0205739 A1 | 7/2019 | Liu et al. |
| 2019/0205740 A1 | 7/2019 | Judd et al. |
| 2019/0205780 A1 | 7/2019 | Sakaguchi |
| 2019/0236437 A1 | 8/2019 | Shin et al. |
| 2019/0236445 A1 | 8/2019 | Das et al. |
| 2019/0294413 A1 | 9/2019 | Vantrease et al. |
| 2019/0294959 A1 | 9/2019 | Vantrease et al. |
| 2019/0294968 A1 | 9/2019 | Vantrease et al. |
| 2019/0303741 A1 | 10/2019 | Appuswamy et al. |
| 2019/0303749 A1 | 10/2019 | Appuswamy et al. |
| 2019/0303750 A1 | 10/2019 | Kumar et al. |
| 2019/0325296 A1 | 10/2019 | Fowers et al. |
| 2019/0332925 A1 | 10/2019 | Modha |
| 2019/0385046 A1 | 12/2019 | Cassidy et al. |
| 2020/0005131 A1 | 1/2020 | Nakahara et al. |
| 2020/0042856 A1 | 2/2020 | Datta et al. |
| 2020/0089506 A1 | 3/2020 | Power et al. |
| 2020/0134461 A1 | 4/2020 | Chai et al. |
| 2020/0234114 A1 | 7/2020 | Rakshit et al. |
| 2020/0301668 A1 | 9/2020 | Li |
| 2020/0380344 A1 | 12/2020 | Lie et al. |
| 2021/0110236 A1 | 4/2021 | Shibata |
| 2021/0173787 A1 | 6/2021 | Nagy et al. |
| 2021/0241082 A1 | 8/2021 | Nagy et al. |
| 2022/0335562 A1 | 10/2022 | Surti et al. |

FOREIGN PATENT DOCUMENTS

| | | |
|---|---|---|
| GB | 2568086 A | 5/2019 |
| WO | 2020044527 A1 | 3/2020 |

OTHER PUBLICATIONS

Abtahi, Tahmid, et al., "Accelerating Convolutional Neural Network With FFT on Embedded Hardware," IEEE Transactions on Very Large Scale Integration (VLSI) Systems, Sep. 2018, 14 pages, vol. 26, No. 9, IEEE.

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Bang, Suyoung, et al., "A 288 µW Programmable Deep-Learning Processor with 270KB On-Chip Weight Storage Using Non-Uniform Memory Hierarchy for Mobile Intelligence," Proceedings of 2017 IEEE International Solid-State Circuits Conference (ISSCC 2017), Feb. 5-7, 2017, 3 pages, IEEE, San Francisco, CA, USA.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Gao, Mingyu, et al., "TETRIS: Scalable and Efficient Neural Network Acceleration with 3D Memory," Proceedings of the 22nd International Conference on Architectural Support for Programming Languages and Operating Systems (ASPLOS '17), Apr. 8-12, 2017, 14 pages, ACM, Xi'an, China.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

(56) References Cited

OTHER PUBLICATIONS

Horowitz, Mark, "Computing's Energy Problem (and what can we do about it)," 2014 IEEE International Solid-State Circuits Conference (ISSCC 2014), Feb. 9-13, 2014, 5 pages, IEEE, San Francisco, CA, USA.
Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.
Jeon, Dongsuk, et al., "A 23-mW Face Recognition Processor with Mostly-Read 5T Memory in 40-nm CMOS," IEEE Journal on Solid-State Circuits, Jun. 2017, 15 pages, vol. 52, No. 6, IEEE, New York, NY, USA.
Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.
Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.
Moshovos, Andreas, et al., "Exploiting Typical Values to Accelerate Deep Learning," Computer, May 24, 2018, 13 bages, vol. 51-Issue 5, IEEE Computer Society, Washington, D.C.
Pedram, Ardavan, et al., "Dark Memory and Accelerator-Rich System Optimization in the Dark Silicon Era," Apr. 27, 2016, 8 pages, arXiv: 1602.04183v3, Computer Research Repository (CoRR)—Cornell University, Ithaca, NY, USA.
Rutenbar, Rob A., et al., "Hardware Inference Accelerators for Machine Learning," 2016 IEEE International Test Conference (ITC), Nov. 15-17, 2016, 39 pages, IEEE, Fort Worth, TX, USA.
Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.
Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.
Yang, Xuan, et al., "DNN Dataflow Choice Is Overrated," Sep. 10, 2018, 13 pages, arXiv: 1809.04070v1, Computer Research Repository (CoRR)—Cornell University, Ithaca, NY, USA.
Zhang, Shijin, et al., "Cambricon-X: An Accelerator for Sparse Neural Networks," 2016 49th Annual IEEE/ACM International Symposium on Microarchitecture (MICRO '16), Oct. 15-19, 2016, 12 pages, IEEE, Taipei, Taiwan.
Ardakani, Arash, et al., "An Architecture to Accelerate Convolution in Deep Neural Networks," IEEE Transactions on Circuits and Systems I: Regular Papers, Oct. 17, 2017, vol. 65, No. 4, IEEE.

\* cited by examiner

NEURAL NETWORK INFERENCE CIRCUIT EMPLOYING DYNAMIC MEMORY SLEEP

CLAIM OF BENEFIT TO PRIOR APPLICATIONS

This application is a continuation application of U.S. patent application Ser. No. 16/427,302, filed May 30, 2019, now issued as U.S. Pat. No. 11,347,297. U.S. patent application Ser. No. 16/427,302 claims the benefit of U.S. Provisional Patent Application 62/796,029, filed Jan. 23, 2019, and U.S. Provisional Patent Application 62/798,364, filed Jan. 29, 2019. U.S. patent application Ser. No. 16/427,302, now issued as U.S. Pat. No. 11,347,297, is incorporated herein by reference.

BACKGROUND

In a typical neural network, a standard computation is a dot product between input values (activations) and weight values. A typical way for an integrated circuit to compute these weight values is to use multiply-accumulate (MAC) circuits that repeatedly perform the multiplication of an input value by a weight value, adds that to an existing partial dot product, and stores the new partial dot product. However, this requires numerous clock cycles, as each term in the dot product computed by a MAC uses a separate cycle. In addition, the storage of each intermediate term requires the use of memory (contributing to both slowing down of the computation and use of resources for the read/write operations). Accordingly, techniques for parallelization without massively expanding the surface area of the circuit are required.

BRIEF SUMMARY

Some embodiments provide an integrated circuit (IC) for implementing a machine-trained network (e.g., a neural network). The IC of some embodiments includes a set of input processing circuits, a neural network computation fabric that can be configured to apply a neural network to an input value, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

In some embodiments, at startup of the IC, the microprocessor loads neural network configuration data (e.g., weight values, scale and bias parameters, etc.) from off-chip storage and generates instructions for the neural network computation fabric to write the neural network parameters to memory. In addition, microprocessor loads the neural network program instructions for the computation fabric to its own memory. These instructions are applied by the computation fabric to input data (e.g., images, audio clips, etc.) in order to execute the neural network. The instructions include, e.g., the memory locations to which input values are written, configuration data specifying how to compute specific neural network nodes, etc. Upon receiving input data (e.g., from a sensor on a device that incorporates the IC), the microprocessor provides neural network program instructions to the computation fabric. Once the final output of the neural network is computed, the fabric provides this output back to the microprocessor, so that the microprocessor (or other circuitry on the device) can evaluate this output and perform any actions based on the output.

The microprocessor executes a controller, in some embodiments, that provides the neural network instructions to the computation fabric. Some embodiments provide these instructions to the computation fabric incrementally. For instance, in some embodiments, the system controller on the microprocessor initially loads the instructions for the first layer (or a first portion of the first layer) of the neural network, then waits for a signal from the fabric indicating that these instructions have been completed. Once the instructions for the first portion of the network are completed by the fabric, the system controller provides the fabric with the instructions for the second portion (either a second portion of the first layer, or the second layer of the network), and so on until the network has been fully executed.

As mentioned, the neural network computation fabric includes numerous cores as well as a global channel that connects the cores, with the various data processing circuits configured by the hierarchical set of control circuits. These data processing circuits operate to compute neural network operations in an efficient, low-power manner, according to the configuration data provided by the control circuits.

Some embodiments include a dynamic memory sleep capability to increase power savings. Dynamic memory sleep, in some embodiments, is enabled by the use of a set of memory units (memory banks or "IP"s) that can be individually controlled and put into a sleep mode of operation that consumes less energy. In addition, the compiler, in some embodiments, organizes the data stored in the memory banks such that each memory bank is accessed for particular layers (or operations related to particular layers) and can be put to sleep during the processing of other layers. Putting particular memory bank(s) to sleep, in some embodiments, is performed through a hardware circuit of the core RAM after a certain number of clock cycles (e.g., 5 or 16) have elapsed with no access of the particular memory bank(s) and is used in addition to a shutdown operation controlled by software (i.e., a compiler or a controller of the integrated circuit).

Circuit components involved in dynamic memory sleep, in some embodiments, include a core RAM pipeline, a core RAM sleep controller, a set of core RAM bank select decoders, and a set of core RAM memory bank wrappers (e.g., 12 core RAM memory wrappers for a set of 12 memory banks). A core RAM sleep controller sends a sleep control signal to a corresponding independently controlled memory unit that indicates whether the corresponding memory unit should operate in a sleep mode or a normal node. The sleep control signal, in some embodiments, is at least in part based on a bank select signal received from the set of core RAM bank select decoders. In some embodiments, the core RAM sleep controller includes a finite state machine that maintains and updates a sleep counter value that is also used in determining the type of sleep control signal output by the core RAM sleep controller. The core RAM pipeline introduces latency for read and write inputs such that a signal from a core RAM sleep controller indicating a normal mode of operation can arrive at a core RAM memory bank wrapper before the read and/or write data to give the memory bank enough time to enter a normal mode of operation from a sleep mode of operation before the read and/or write data is received at the core RAM memory bank wrapper.

A typical neural network operates in layers, with each layer including numerous nodes. Examples of neural networks include feed-forward neural networks, regulatory feedback networks, radial basis function networks, recurrent networks, etc. In convolutional neural networks (a type of feed-forward network), a majority of the layers include computation nodes with both a linear function followed by a non-linear activation function (applied to the result of the linear function). The linear function is a dot product of input values (either the initial inputs based on the input data for the first layer, or outputs of the previous layer for subsequent layers) and predetermined (trained) weight values, along with bias (addition) and scale (multiplication) terms, which are also predetermined based on training. As such, for convolutional neural networks, the dot products are the primary computation that uses the most circuit resources.

In some embodiments, each segment of the global channel includes (in addition to the cluster controllers) a dot product bus, a set of post-processing circuits, and an output bus. The dot product bus, in some embodiments, includes a number of independent dot product bus lanes that each receives partial dot products from the cores, aggregates these dot products together, and provides the aggregated dot products to the post-processing circuits. In some embodiments, configuration data from the cluster controllers specifies to which post-processing unit each aggregated dot product is sent. Each lane of the dot product bus spans all of the channel segments, each of which aggregates the partial dot products from its own cores. These aggregated values are then aggregated together by additional circuits of the dot product bus lane, and configuration data specifies whether to pass the aggregated dot products in one direction of the segment or the other, or whether that segment is the final aggregator for the dot product (in which case that aggregated dot product is provided to a post-processing unit in that segment).

In some embodiments, each segment includes the same number of post-processing units as dot product bus lanes, with each post-processing unit receiving the output of a different dot product bus lane as its primary input. The post-processing units, as mentioned, perform the non-dot product functions of the neural network nodes. For a typical computation node of a convolutional (or fully-connected) layer, this includes a bias factor, a scaling factor, and a non-linear activation function. In some embodiments, the outputs of the linear function are quantized or truncated to a particular number of bits (e.g., 4 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design.

The non-linear activation function, in some embodiments, is implemented as a lookup table rather than a hardwired function. This enables the IC to execute different neural networks that use different activation functions and, in some embodiments, allows for different activation functions to be used in different layers of the neural network. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function.

In addition to these operations, in some embodiments the post-processing units include additional circuitry for (i) performing additional dot product operations if required and (ii) performing operations for neural network computation nodes that do not use dot products. The post-processing units of some embodiments each have the ability to combine dot products from two separate cycles if a dot product is too large to be computed in a single cycle across the cores of the computation fabric. In addition, if a particular filter slice needs to be split across multiple cores (because of too many non-zero weight values, as described in greater detail in related U.S. patent application Ser. No. 16/212,643), the post-processing unit is configured to account for that. Furthermore, some embodiments enable dot products to be double the size of the standard quantized output (e.g., 8-bit rather than 4-bit) by using dot products from multiple cycles and bit-shifting the first set of input data.

Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output bus carries the computation node outputs from the post-processing units back to the cores, to be stored in the memory of the core and used as inputs for the next layer of neural network computation nodes. In some embodiments, the output values may be computed by post-processing units in one cluster but carried to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value.

As mentioned, the cores compute partial dot products in parallel that are provided to the dot product bus of the local channel segment. In some embodiments, the cores include memory that stores the weight values and input values, an input buffer into which input values are loaded for the partial dot product computations, a set of weight value buffers into which weight values are loaded for the partial dot product computations, a controller or set of controller circuits for loading the input values and weight values from memory into the respective buffers, and a set of partial dot product computation circuits.

In some embodiments, the number of partial dot product computation circuits in each core is equal to (i) the number of weight value buffers in the core (or half of the number of weight value buffers, if primary and secondary buffers are used), (ii) the number of independent lanes of the dot product bus, and (iii) the number of post-processing units of each segment of the global channel. Thus, for a typical neural network computation node, the partial dot products computed by the partial dot product computation circuits having a particular index are aggregated by the dot product bus lane with the same index and that aggregated dot product is provided for post-processing to one of the post-processing units with the same index (i.e., the post-processing unit with that index in one of the channel segments).

As mentioned, each core includes one input value buffer and numerous weight value buffers in some embodiments. In convolutional neural networks, a set of input values are used as the inputs to a number of different nodes, and each layer has numerous different filters (sets of weight values). For parallelization within the cores, such a set of input values are loaded into the input value buffers of the cores used to compute the dot product for a node (by computing partial dot products that are then aggregated), while the weight values for each of these different nodes are loaded into the weight value buffers (for a node computed across multiple cores, the weight values for a given node are loaded into the weight value buffers with the same index in each of the cores). The partial dot product computation circuits corresponding to these weight value buffers then simultaneously compute the partial dot product computations for the loaded input values.

In some embodiments, the weight values for each layer of the network are ternary values (e.g., each weight is either zero, a positive value, or the negation of the positive value), with at least a fixed percentage (e.g., 75%) of the weight values being zero. Using ternary weight values allows for the weights to be treated as {0, 1, −1} (with a potential multiplication by the actual positive weight value in the post-processor), such that the multiplication of each input value by its weight value can be handled with a simple circuit that avoids actual multiplier circuits. The remainder of the partial dot product computation in a core can then be computed with an adder tree. The sparsity requirement allows for some embodiments to reduce the size of the partial dot product computation circuits by mapping each of a first number (e.g., 144) input values to a second number (e.g., 36) of dot product inputs, such that each input value with a non-zero corresponding weight value is mapped to a different one of the dot product inputs.

In addition to storing discrete weight values (e.g., 0, 1, and −1), in some embodiments the input values (which, other than for the first layer, are output values of previous computation nodes) are discrete values (e.g., 4-bit values). As such, for the simplest type of dot product computation, the neural network computation circuit of some embodiments places the following restrictions on the computation: (i) all of the input values should be of the specified discrete size, (ii) the maximum number of input values is the size of the input buffer multiplied by the number of cores, (iii) all of the weight values are either 0, +a, or −a (and thus can be stored as 0, 1, and −1), and a large enough percentage of the weight values are 0 that the input values with non-zero weight values can each map to a different multiplexer input.

The input values (and their corresponding weight values), in some embodiments, cannot be easily moved around to different cores because (i) the input values are used for numerous simultaneous dot products and (ii) the input values are efficiently carried in contiguous blocks to the cores by the output bus, with the ordering of these input values dependent on the post-processing unit indices that computed them as output values in the previous layer.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments provide an integrated circuit (IC) for implementing a machine-trained network (e.g., a neural network). The IC of some embodiments includes a set of input processing circuits, a neural network computation fabric (also referred to as a neural network inference circuit) that can be configured to apply a neural network to a set of input values, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

Figure 1:
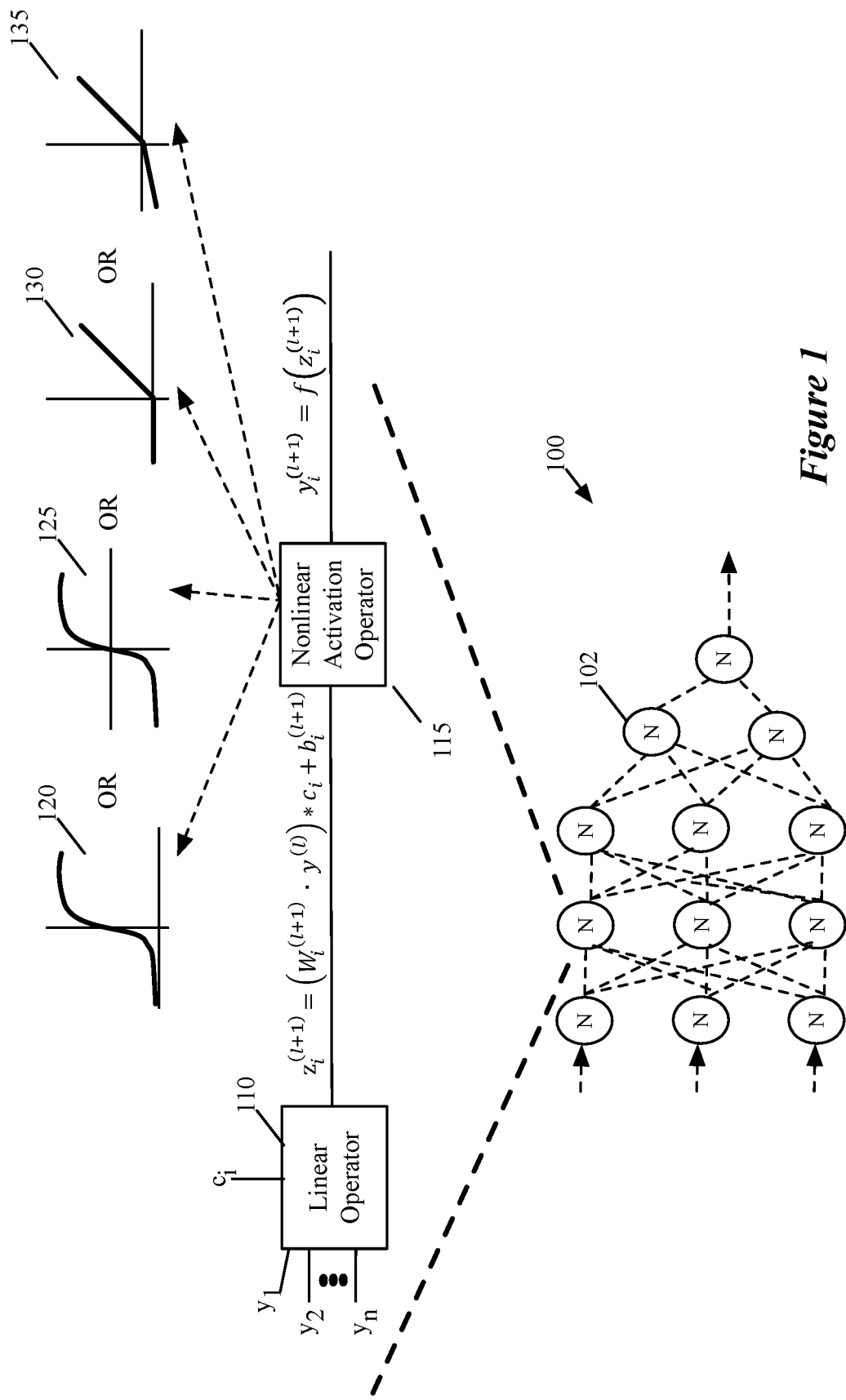
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, fully-connected layers, and normalization layers. The convolutional layers of some embodiments use a small kernel (e.g., 3×3×3) to process each tile of pixels in an image with the same set of parameters. The kernels (also referred to as filters) are three-dimensional, and multiple kernels are used to process each group of input values in in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., l∈{1, . . . , L−1} index the hidden layers of the network, with l=0 representing the input layer and l=L representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = (W_i^{(l+1)} \cdot y^{(l)}) * c_i + b_i^{(l+1)} = \sum_{k=1}^{n}(w_{ik}^{(l+1)} * y_k^{(l)}) * c_i + b_i^{(l+1)}. \quad (A)$$

The constant value $c_i$ is a value to which all the weight values are normalized. In some embodiments, the constant value $c_i$ is 1. The symbol * is an element-wise product, while the symbol is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output $y^{(l+1)}$ of the nonlinear component 115 of a node in layer l+1 is a function of the node's linear component, and can be expressed as by Equation (B) below:

$$y_i^{(l+1)} = f(z_i^{(l+1)}). \quad (B)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv: 1502.01852, 2015. In some embodiments, the activation functions can be other types of functions, like cup functions and periodic functions.

Equation (B) can be expressed in the following expanded format of Equation (C):

$$y_i^{(l+1)} = f(z_i^{(l+1)}) = f[(\sum_{k=1}^{n} w_{ik} * y_k) + c_i + b_i^{(l+1)}]. \quad (C)$$

In this equation, $w_{ik}$ are weight values associated with the inputs $y_k$ of the node i in layer l+1.

Before a multi-layer network can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

As mentioned, some embodiments provide an IC that implements a machine-trained network such as that shown in FIG. 1. The ICs of some embodiments are configurable to implement different networks trained to perform a particular function, which may have various different arrangements of nodes and different trained weight values. For instance, the ICs may implement networks for object or facial recognition in images, voice recognition in audio samples, etc. The IC of some embodiments includes a set of input processing circuits, a neural network computation fabric that can be configured to apply a neural network to an input value, and a microprocessor (e.g., for controlling the input processing circuits and configuring the neural network computation fabric).

Figure 2:
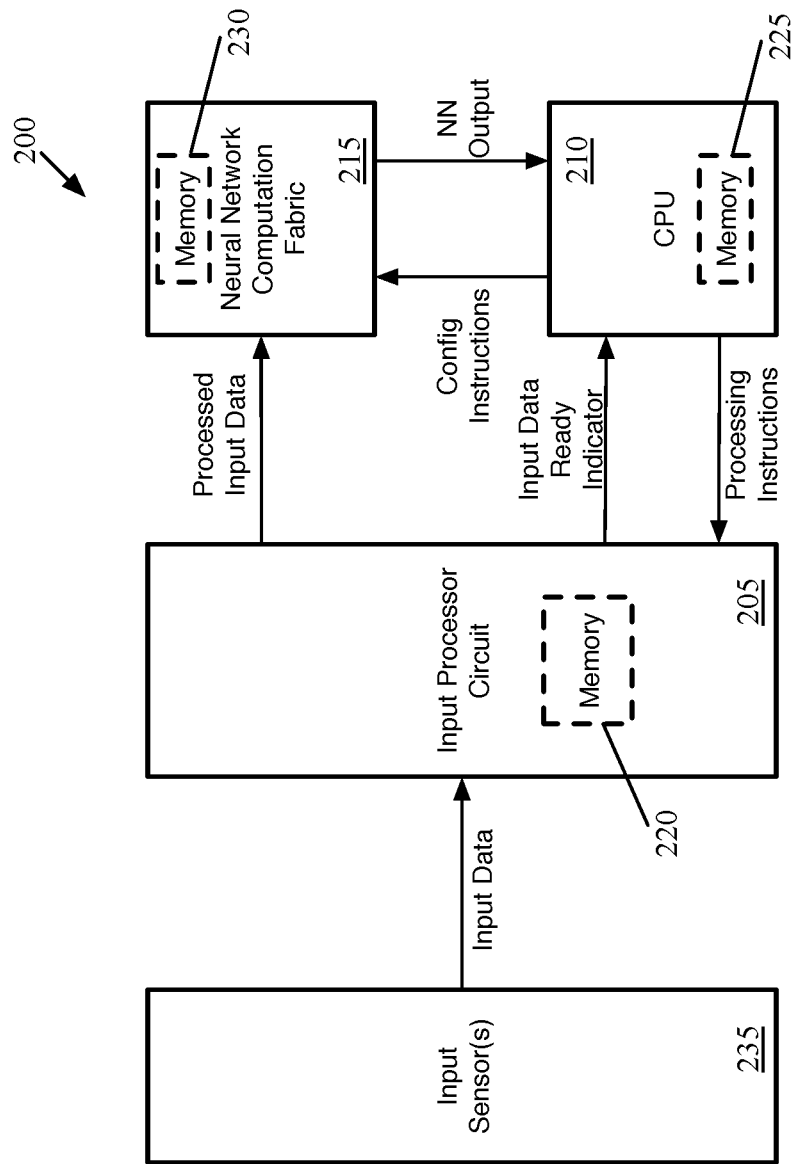
FIG. 2 conceptually illustrates an integrated circuit of some embodiments.

FIG. 2 conceptually illustrates such an IC 200 of some embodiments. As shown, the IC includes an input processor circuit 205, a microprocessor (CPU) 210, and a neural network computation fabric 215. Each of these components 205-215 also has corresponding memory (e.g., random access memory (RAM)) 230. In addition, in some embodiments, the IC is integrated into a device (such as an Internet of Things (IOT) device) with one or more input sensors 235. These input sensors can include cameras (e.g., for capturing video images on which the neural network computation fabric 215 performs face or object recognition, etc.), microphones (e.g., for capturing audio on which the neural network computation fabric 215 performs voice recognition, speech processing, etc.), or other types of input sensors. In other embodiments, the input sensors 235 are located on a separate device that is linked with the IC 200.

In some embodiments, at bootup of the IC 200, the CPU 210 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 215 to write the weight values and other data to its memory 230. In addition, CPU 210 loads the neural network program instructions for the computation fabric to its own memory 225. These instructions are applied by the computation fabric 215 to input data in order to execute the neural network. These runtime instructions include, e.g., indications as to which pre-loaded sets of instructions to use for each set of calculations, etc.

The input processor circuit 205 receives input data (e.g., still images or video frames, sounds, etc.) from the input sensor(s) 235, and processes these according to processing instructions received from the CPU 210. The CPU 210 stores in its memory instructions for the input processor circuit to prepare input data for the computation fabric 215 as well as the neural network program instructions. These instructions identify, in some embodiments, any sort of initial processing to apply to the raw data (e.g., decompression of compressed data, etc.) as well as how to arrange the data to be provided to the computation fabric 215. For an image, e.g., these instructions might specify the order in which the pixels should be arranged and streamed to the computation fabric 215, so that the computation fabric stores this data in the appropriate locations of its memory 230 for subsequent operations. The input processor circuit 205 also sends signals to the CPU 210 to indicate when it has fully buffered an input (e.g., a frame of video) and when the input is prepared to be sent to the computation fabric 215.

In addition to instructing the input processor circuit 205 how and when to provide input data to the computation fabric 215, the CPU 210 provides the neural network program instructions to the computation fabric. In some embodiments the CPU 210 provides these instructions in stages (e.g., one layer or portion of a layer at a time). Once the final output of the neural network is computed, the fabric 215 provides this output back to the CPU, so that the CPU (or other circuitry on the device) can evaluate this output and perform any actions based on the output.

Before describing the controller structure on the computation fabric and the parsing of configuration instructions in detail, an overview of the neural network computation fabric structure will be provided. The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero.

Figure 3:
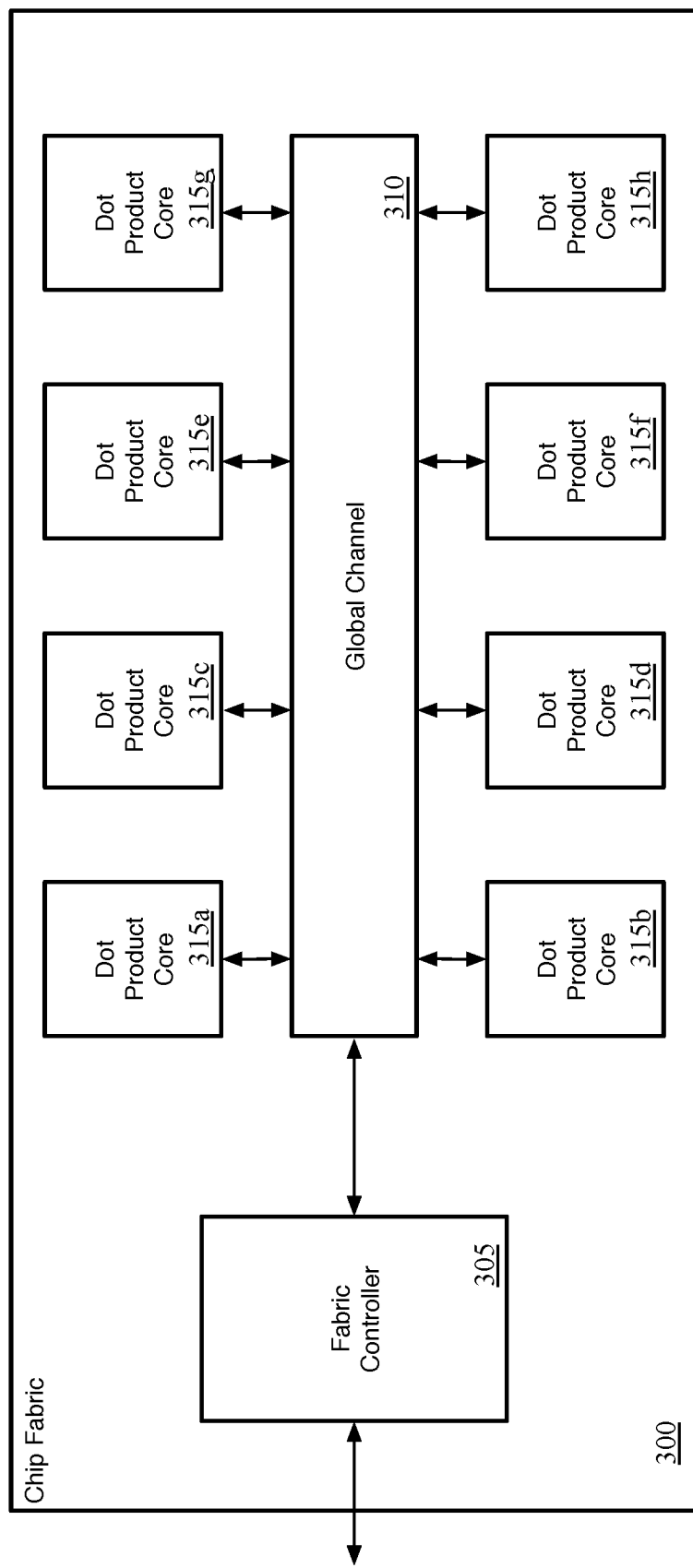
FIG. 3 conceptually illustrates the neural network computation fabric of some embodiments.

FIG. 3 conceptually illustrates the neural network computation fabric 300 (also referred to as the chip fabric) of some embodiments. The chip fabric 300 of some embodiments includes a fabric controller 305, a global channel 310, and a set of dot product cores 315$a$-$h$. The connections between the various components 305-315 represent the flow of both control data (e.g., configuration data for a particular neural network layer) and computation data at runtime in some embodiments.

The fabric controller 305 is responsible for managing the operation of the rest of the chip fabric 300 (e.g., the dot product cores 315) in some embodiments. The fabric controller 305 loads instruction arguments (e.g., weight values, previously computed activation values, etc.) from local memory (not shown) on the chip, maps instructions into a sequence of memory-mapped register writes, synchronizes the downstream controllers (e.g., controllers for the various cores 315), etc. The instructions managed by the fabric controller 305 are configured at compile time, in some embodiments, based on the parameters of the network being implemented by the chip fabric 300. In some embodiments, the fabric controller 305 interacts with the microprocessor of the IC as well (i.e., the fabric controller 305 handles the communication with the CPU 210 shown in FIG. 2).

The chip fabric also includes numerous dot product cores 315 as well as a global channel 310 that connects the cores, with these data processing circuits configured by the fabric controller (and a set of hierarchical control circuits, in some embodiments). The data processing circuits 310 and 315 operate to compute neural network operations in an efficient, low-power manner, according to the configuration data provided by the control circuits.

The dot product cores 315$a$-$h$ include circuitry for computing partial dot products in some embodiments, which is described in further details in related U.S. patent application Ser. No. 16/212,643. In some embodiments, this circuitry includes memory and/or buffers for storing weights and activations, controllers for reading these values out of memory, and adder trees for computing the partial dot products based on the weight and activation inputs. The adder trees and input circuitry of some embodiments are described below in greater detail, by reference to FIG. 7, and as described in related U.S. patent application Ser. No. 16/212,643 which claims priority to U.S. Provisional Patent Application 62/773,164 which are hereby incorporated by reference.

The global channel 310 is responsible for providing a communications bus for control and computation data between the fabric controller 305 and the cores 315, as well as from one core to another. The global channel 310, among other operations, accumulates partial dot products from multiple cores when computing dot products that require more computations than can be performed in a single core, and performs post-processing on these dot products. In addition, the global channel 310 carries activations (i.e., computation node outputs) after post-processing for storage (and for use as inputs to subsequent computation nodes) in other cores 315. In some embodiments, the global channel 310 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 310.

The chip fabric 300 of some embodiments computes numerous neural network computation nodes simultaneously, with the computation for one node often spread across multiple cores (and subsequently the global channel). In some cases, if a neural network layer is small enough, then computation for that layer may be confined to a single core 315. However, if multiple cores are used for a given layer (any number of cores may be used in some embodiments), then each dot product computed for that layer is spread across all of the cores 315 in use.

That is, for a dot product computed across more than one core 315, each of these cores computes a partial dot product from a subset of the input values and weight values for the node, then provides these partial dot products to the global channel 310. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then computes dot products of these weight values with numerous different sets of input values.

In the simplest case, all of the partial dot products are computed in the same clock cycle and provided at the same time to the global channel 310. In some cases, however (e.g., for dot products with a very large number of terms), each core 315 computes more than one partial dot product, requiring multiple clock cycles. Based on configuration data specifying which outputs from the cores are to be added together (and whether multiple partial dot products are required from the same core), the global channel 310 aggregates these partial dot products to compute the complete dot product for each node, then applies various post-processing functions (e.g., the bias, scale, and non-linear activation functions) to compute the output of each node.

Figure 4:
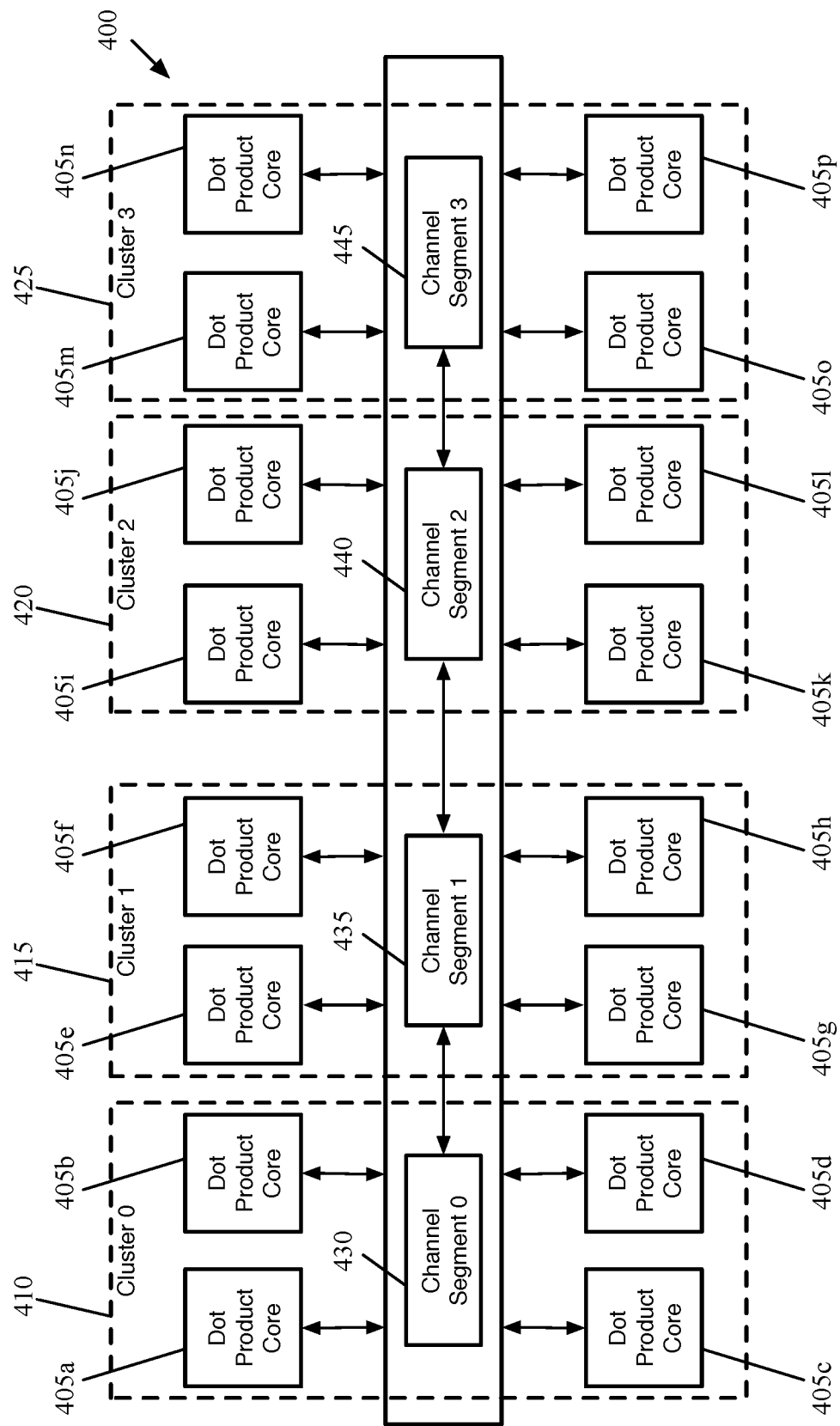
FIG. 4 illustrates a neural network computation fabric of some embodiments with sixteen dot product cores grouped into four clusters.

In some embodiments, the dot product cores are grouped into clusters, and the global channel includes separate segments for each such cluster. FIG. 4 illustrates a neural network computation fabric 400 of some embodiments with sixteen dot product cores 405a-p grouped into four clusters 410-425. In addition, the global channel includes four channel segments 430-445. Each of these channel segments includes the same circuitry in some embodiments, with the exception that buses in the first channel segment 430 and last channel segments 445 only connect to corresponding buses in one other channel segment while the buses in the intermediate channel segments 435 and 440 connect to corresponding buses in two channel segments.

The data processing circuitry of each of the channel segments 430-445 includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The outputs of the post-processing circuits are the computation node outputs (activations). The output bus, or activation write bus, carries the outputs of the post-processing circuits to the cores 405a-p to be stored as inputs for the next computation layer.

In some embodiments, each cluster 410-425 or group of clusters (e.g., clusters 410 and 415 being one group and clusters 420 and 425 being a second group) can execute a separate neural network. This allows the fabric to execute multiple networks simultaneously, so long as the networks are not so large as to require more than the cores of the allocated cluster. For instance, a single chip of an IOT device could run both a facial recognition network and an object recognition network, a facial recognition network and a language parsing network, etc.

Figure 5:
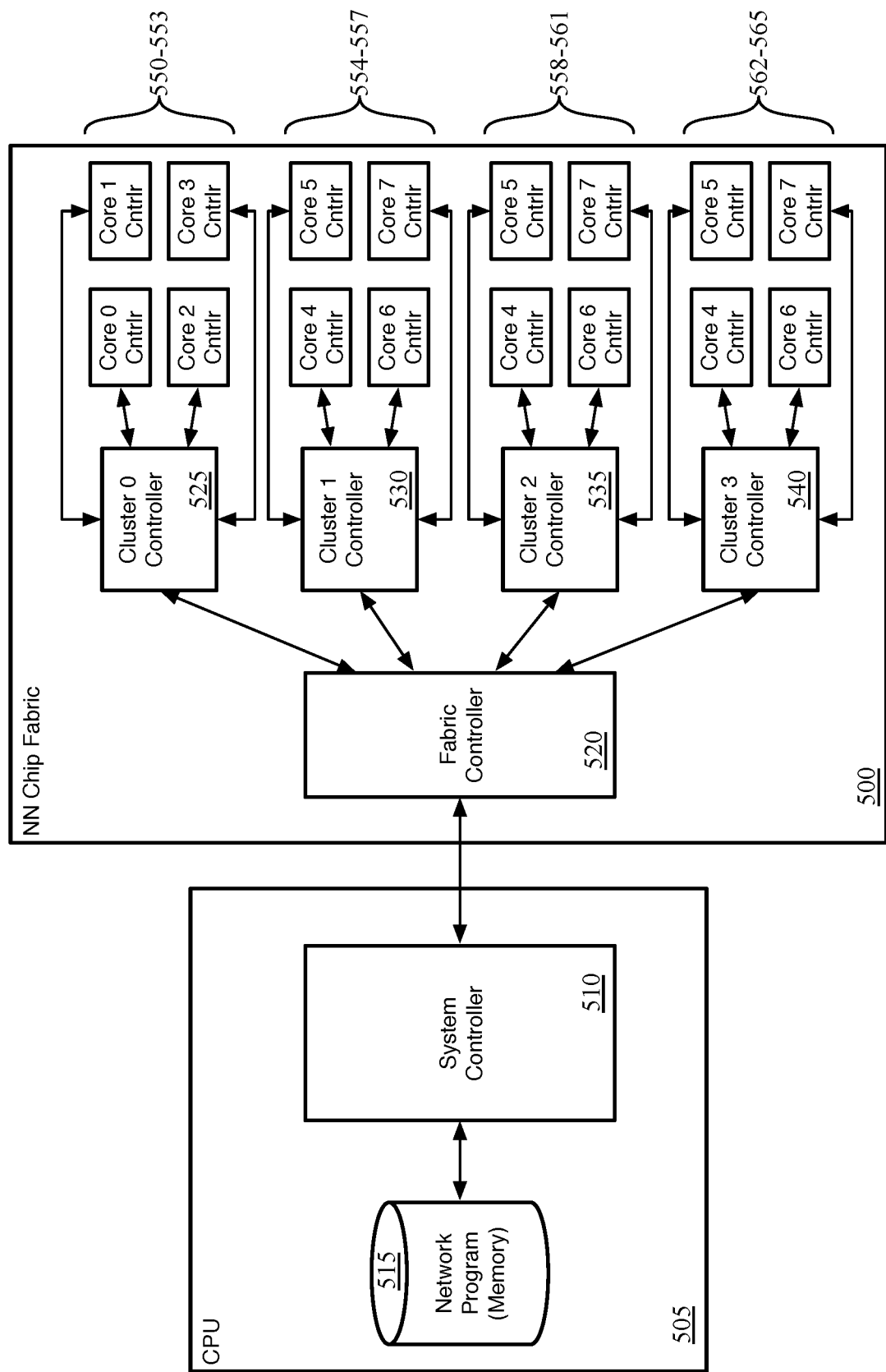
FIG. 5 conceptually illustrates a set of controller circuits for configuring a neural network chip fabric of some embodiments to execute a neural network.

Before describing the structure of the global channel in greater detail, the hierarchical control and configuration of the neural network chip fabric will be described. FIG. 5 conceptually illustrates the set of controller circuits for configuring a neural network chip fabric 500 of some embodiments to execute a neural network. As shown, a CPU 505 executes a system controller 510 and stores a neural network program 515 (i.e., the compiled version of the neural network) in its memory.

The system controller 510 provides the neural network instructions to the chip fabric 500 (per the stored network program 515) for the chip fabric to execute the program on incoming input data (e.g., images, etc.). In some embodiments, the system controller 510 provides these instructions to the chip fabric 500 incrementally. For instance, in some embodiments, the system controller 510 initially loads the instructions for the first layer of the neural network, or a portion of the first layer, then waits for a signal from the chip fabric 500 indicating that these instructions have been completed.

If a layer of the network is small enough to be completed in a single pass, then the compiler of some embodiments schedules the entire layer for one pass. However, as described in related U.S. patent application Ser. No. 16/212,643, there is a maximum number of filters that can be loaded in a single pass (e.g., 64). In addition, in some embodiments there is a maximum number of output sets that can be written to the same core in the same pass, so this can also constrict the number of filters in a pass. The chip fabric computes the output all of the nodes for each filter loaded (i.e., each pass loads all of the input activations for the layer in the correct order for the outputs to be computed. However, if a layer has more than this maximum number of filters, then the layer will be divided across multiple passes. Once the first portion of the network is completed, the system controller 510 provides the fabric 500 with the instructions for the second portion (e.g., a second layer, or a second pass of the first layer), and so on until the chip fabric has fully executed the network.

The chip fabric 500 includes a hierarchical control structure for configuring the data processing circuitry (i.e., the dot product cores and global channel segments) to execute the neural network instructions from the system controller 510. As shown, the chip fabric 500 of some embodiments includes (i) a fabric controller 520 that interacts with the system controller 510 on the CPU 505, (ii) a set of cluster controllers 525-540, and (iii) a set of core controllers 550-565. Some embodiments include one cluster controller for each cluster of the chip fabric and one core controller for each core (in this case the chip fabric 500 has four clusters with four cores each).

The fabric controller 520 provides the point of interaction with the CPU 505 for the chip fabric 500, receiving neural network program instructions from the system controller 510 and sending signals to the system controller to indicate when instructions have been completed. Upon receiving neural network instructions (e.g., for a layer of the network or portion of a layer), the fabric controller 520 receives these neural network instructions, parses the instructions to identify the active cores (and thus the active clusters), and unpacks additional arguments stored in local instruction memory on the chip fabric. In some embodiments, in order to minimize power usage, the instructions provided from the CPU are high-level commands that the fabric controller parses in order to determine more detailed instructions for the lower-level controllers. Doing so limits control signal power consumption on the chip while encapsulating implementation details of the lower-level (cluster, core) circuits.

For example, in some embodiments the instructions from the system controller 510 to the fabric controller 520 specify to execute a particular pass of a particular layer of the network, and the fabric controller memory includes the required information to execute this specific pass. In some embodiments, this information is conveyed by the system controller instructions specifying to execute a particular type of pass or layer (e.g., convolution) based on the arguments found at a particular memory location of the fabric controller's memory. The specified memory location stores arguments such as the source cores for the computations (i.e., the cores that will perform the dot product calculations) and the destination cores for the output values (i.e., the cores to which the output values are stored), the memory locations in the cores at which to find the weight and/or input values for the computations (in some embodiments, the weight values are loaded into memory initially such that these memory locations are the same across all of the source cores), information for calculating the non-linear activation function for the layer (e.g., the lookup table mapping information), etc. Memory allocation, in some embodiments, is performed in such a way that large numbers of clock cycles elapse between access to certain portions of memory and the memory portion (e.g., memory banks) can be put to sleep (i.e., enter a power-saving mode that does not cause data to be lost) between accesses.

Because layers may potentially include thousands of output activation values, having the CPU specify a core and RAM location for each such activation value would require a lot of power. Instead, as described, some embodiments specify only a few parameters required for the chip fabric to determine the memory locations for each activation value (e.g., the cores at which the values will be stored, the starting memory address that is the same for each core, and the dimensions of the activation layer). In addition, similar principles apply to the use of input values already stored in RAM (the outputs of the previous layer) for the dot products of the current layer. The weight values and their location in memory, the location of the input values, the lookup table configuration for a layer, etc. are all the same for each network input (e.g., each frame of video) as the network is statically scheduled, so resources can be saved by storing all of this information on the chip at bootup, with a minimal amount of instruction information sent from the CPU for each layer or pass (i.e., only the location in the fabric controller of the arguments for the current layer).

The fabric controller then provides cluster instructions to the cluster controllers for the identified clusters that are in use for the current neural network layer, and waits for completion signals from the clusters indicating that the current set of instructions has been executed (and thus, that the fabric controller can notify the system controller on the CPU that the current set of instructions is complete, causing the system controller to provide the next set of instructions). Avoiding use of some of the clusters when possible provides power savings, as these cores can be powered down, or at least the memories in the cores put to sleep. Even for networks that require the use of all of the cores of the chip fabric, often the initial layers have smaller dot product computations that require fewer cores. In addition, in some embodiments, the fabric controller synchronizes the cluster controllers, ensuring that dot products computed across multiple clusters are aggregated together correctly.

In some embodiments, the cluster instructions provided by the fabric controller are not fully parsed instructions, pushing some of this work to the cluster and/or core controllers. For instance, the fabric controller may only provide the starting memory address for the activations and the activation layer dimensions, allowing the cluster controllers to determine at which core (and the RAM location within that core) each activation value is to be stored. The fabric controller also broadcasts these instructions in some embodiments, while including certain bits that specify the difference in setup between the clusters (or whether certain clusters even need to act on the instructions). Some embodiments broadcast the instructions only to the clusters involved in the computation (which could include clusters with source cores, destination cores, or both). This broadcasting reduces latency and power consumption as compared to sending separate sets of instructions to each cluster.

Each of the cluster controllers 525-540 receives instructions from the fabric controller and configures its own segment of the global channel in addition to parsing the instructions to identify configuration data for each of the cores in its cluster. That is, each cluster controller 525-540 that receives cluster instructions for a given high-level instruction directly configures the dot product bus, the post-processing units, and the activation write bus in its channel segment. In addition, these cluster controllers 525-540 determines which of its cores require the instructions and provides these instructions to the core controllers for these identified cores.

Much as the fabric controller 520 parses the high-level instructions from the system controller 510, the cluster controllers 525-540 of some embodiments decompose the instructions from the fabric controller 520 to determine the configuration data to provide to its channel segment circuits (dot product bus, post-processing units, and activation write bus) as well as the sets of instructions for each of its cores. The cluster controllers configure the channel segment circuits to, e.g., aggregate the partial dot products from the cores correctly (both within a channel segment and across channel segments), provide these aggregated dot products to the post-processing units in the correct channel segment, perform post-processing operations, and provide the output of the post-processors to the correct core. In some embodiments, this information both comes from the fabric controller (e.g., the lookup table mapping for the non-linear activation function) as well as from information stored in cluster controller memory.

The use of separate cluster controllers enables the ability of the chip fabric to execute multiple separate networks simultaneously in some embodiments. The fabric controller 520 can provide instructions to the first cluster controller 525 for a layer of a first neural network and, so long as those instructions do not require the use of other clusters, the first cluster can execute the entire neural network layer in a self-contained manner. At the same time, the fabric controller 520 could provide instructions to the second cluster controller 530 for a layer of a second neural network, with the second cluster executing the entire neural network layer in a self-contained manner. The third and fourth cluster controllers 535 and 540 could receive instructions for third and fourth networks as well, to execute at the same time as the first two. In addition, other combinations of clusters can execute multiple networks simultaneously (e.g., the first two clusters executing a first network and the second two clusters executing a second network, the first two clusters executing a first network while the third and fourth clusters each separately execute second and third networks, etc.

The cluster controllers 525-540, as mentioned, also provide the appropriate configuration data to each of the core controllers 550-565, which coordinate the dot product processing in the core (as well as the direct delivery of input activation values to the global channel for pooling, element-wise operations, etc.). In some embodiments, the cluster controllers do not fully parse the instructions to specify each individual memory read or write, but instead provide the higher-level instructions to each core controller. In addition, some embodiments broadcast the instructions from a particular cluster controller to each of the core controllers within the cluster (or the core controllers for each of the cores active in the current pass), while including certain bits that specify the difference in setup between the cores. This broadcasting reduces latency and power consumption as compared to sending separate sets of instructions to each core.

The core controllers 550-565 then parse these instructions to determine the specific configuration data for the operations of the core. This configuration data includes memory locations for various read operations to read and align weight and activation values, enable bits for the dot product operations, memory locations for write operations after activations have been computed, etc. Once the instructions are fully executed, the core controllers 550-565 send completion signals to the cluster controllers 525-540. Similarly, once the cluster controllers 525-540 receive these completion messages, they send similar messages to the fabric controller 520, which can then notify the system controller executing on the CPU that the instructions are complete. In some embodiments, the last set of neural network instructions is a set of memory read operations, for the computation fabric to deliver the neural network output results to the system controller for any post-processing operations (e.g., a soft-max operation to generate a probability, etc.). After this, the system controller puts the fabric to sleep until the next set of input data is to be processed, in some embodiments. If only a portion of the fabric is involved in executing the neural network (e.g., because one or more clusters execute a different neural network in parallel), then that portion of the fabric is put to sleep in some embodiments.

Figure 6:
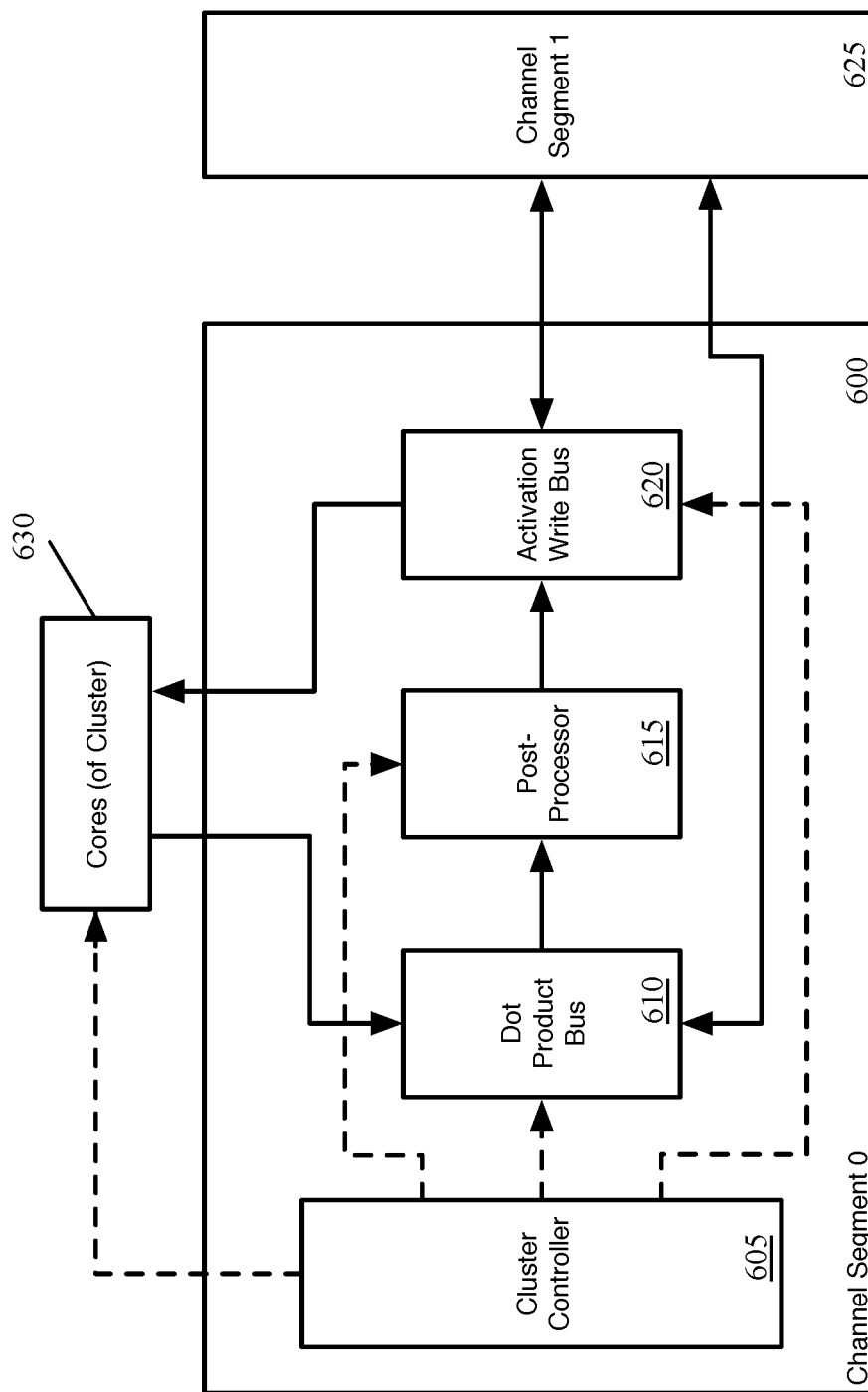
FIG. 6 conceptually illustrates the circuit blocks of a channel segment of some embodiments.

Returning to the neural network computation circuitry, FIG. 6 conceptually illustrates the circuit blocks of a channel segment 600 of some embodiments (e.g., one of the channel segments 430-445 shown in FIG. 4). The channel segment 600 includes a cluster controller 605, a dot product bus 610, a post-processor 615, and an activation write bus 620 (also referred to as an output bus). In addition to the channel segment 600, the figure also illustrates an additional channel segment 625 and the cores 630 of the local cluster for the channel segment 600, as the circuit blocks of the channel segment 600 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 630 to the post-processor 615 for pooling nodes or element-wise operators, is not shown.

The cluster controller 605 configures the dot product bus 610, post-processor 615, and activation write bus 620 as per the configuration instructions received from the fabric controller in some embodiments. For the dot product bus 610, this configuration data specifies, in some embodiments, (i) which partial dot products are to be added together as part of the same neural network computation node and (ii) to which post-processing unit each aggregated dot product is sent (the post-processor 615 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 615, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table), as well as other data. For the activation write bus 620, the configuration data indicates to which cores each output value is to be delivered, in some embodiments. The operation of each of these circuit blocks 610-620 is discussed in greater detail below.

As mentioned, the solid lines indicate the flow of neural network computation data, for a node in a convolutional or fully-connected layer. The cores 630 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these cores.

These partial dot products are output to the dot product bus 610, which aggregates the partial dot products from the cores 630 of the local cluster. The dot product bus spans all of the channel segments, and the dot product bus in each channel segment aggregates the partial dot products from the cores of its local cluster. The dot product bus 610 in the channel segment 600 also exchanges locally-aggregated dot products with its neighboring segments for further aggregation if needed. In this case, the channel segment 600 only has one neighboring segment, but internal channel segments (e.g., the segments 435 and 440 in FIG. 4) will have two such neighboring segments. The configuration data from the cluster controller 605 specifies whether to send these dot products in one direction or the other along the global channel, or to aggregate the dot products from the neighboring channels locally, depending on where post-processing will occur for each dot product.

The post-processor 615 includes numerous post-processing units that receive the dot products from the dot product bus and perform the non-dot product functions of the neural network computation nodes. For a typical computation node of a convolutional (or fully-connected) layer, these functions include an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table rather than a hardwired function. This enables the IC to execute different neural networks that use different activation functions and, in some embodiments, allows for different activation functions to be used in different layers of the neural network.

The activation write bus 620 receives the computation node activation outputs from the post-processing units and carries these outputs back to the cores 630, to be stored in the memory of the core and used as inputs for the computation nodes of the next layer of the neural network. The activation write bus connects to the cores 630 in the local cluster as well as the activation write bus in the neighboring channel segment 625. As with the dot product bus 610, the activation write bus 620 of some embodiments includes lanes, with each post-processing unit of the post-processor 615 sending its output to a different one of these lanes.

In some embodiments, the output values may be computed by the post-processor 615 in one cluster but carried by the activation write bus 620 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 620 also includes a right shift circuit for each core that is used to align the output values for the core, in order for the values to be stored in contiguous blocks within the core RAM. Additional details regarding, and some embodiments of, these circuits are explained in greater detail in related U.S. patent application Ser. No. 16/212,643, now issued as U.S. Pat. No. 11,250,326, which claims priority to U.S. Provisional Patent Application 62/773,164, both of which are hereby incorporated by reference.

Figure 7:
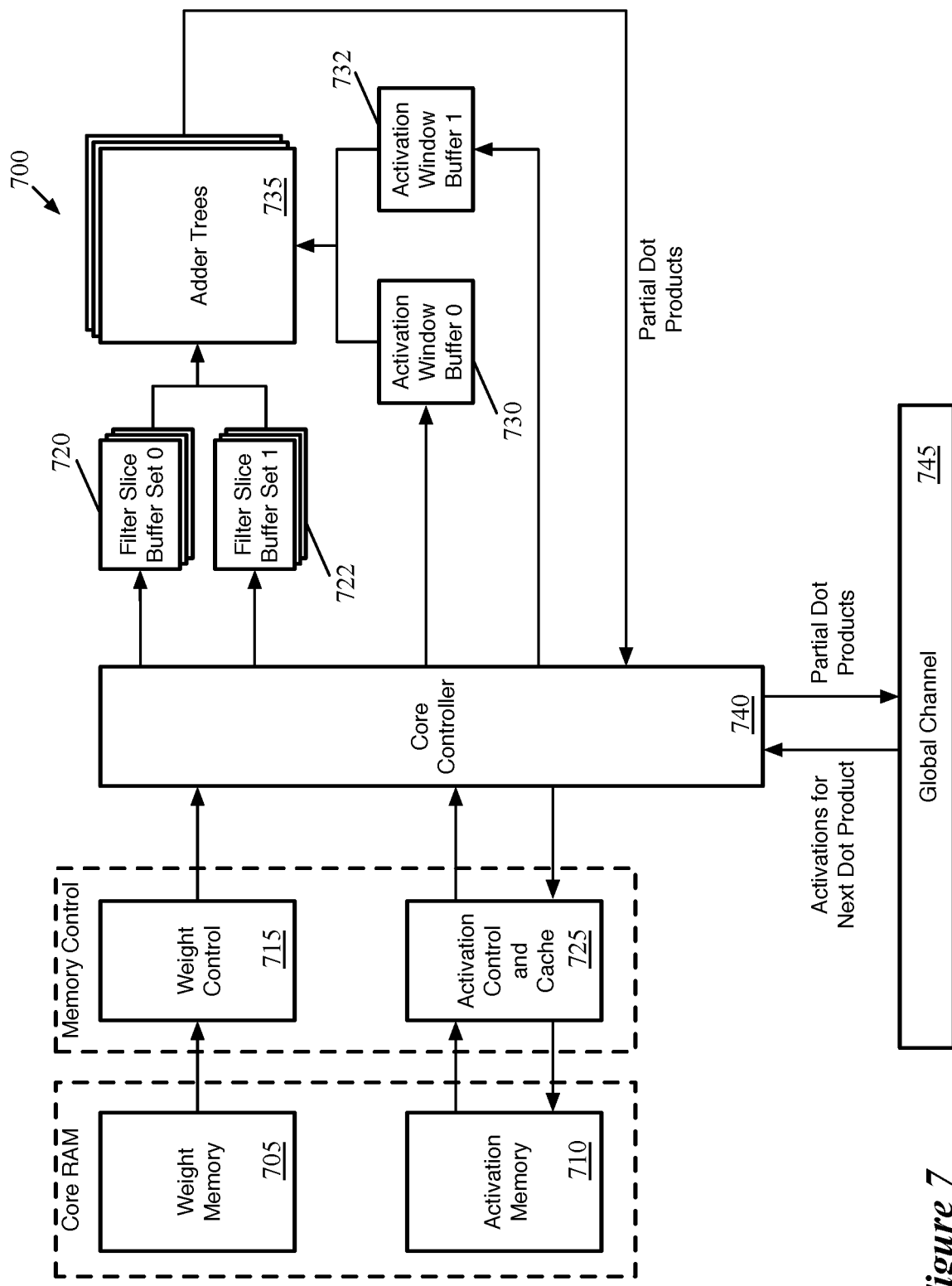
FIG. 7 conceptually illustrates the data flow within one of the cores of some embodiments for a dot product computation.

As mentioned, the dot product cores perform the majority of the dot product computation of the chip fabric of some embodiments. FIG. 7 conceptually illustrates the data flow 700 within one of the cores of some embodiments for a dot product computation. This data flow will be described with certain specifics (e.g., weight sizes, number of separate adder trees simultaneously computing partial dot products, etc.) as examples, but it should be understood that different embodiments may use different sizes for weight and/or activation values, different numbers of adder trees within a core, etc.

In some embodiments, the dot product cores store weight values (e.g., weights for multiple nodes in multiple layers) in the weight memory 705 and activation values in the activation memory 710. In some embodiments, as shown, the memories 705 and 710 are part of a single block of memory for the core (e.g., banks of random access memories such as SRAMs). In addition to storing weight and activation values, in some embodiments the microprocessor of the IC can use the memories in the cores as overflow memory (e.g., to store an image before the image is processed and provided as input to the neural network fabric).

The weight values are part of the network parameters and thus are determined at compile time (and do not change at runtime), while the activation values (the input values to a particular node being computed) are the output values from a previous computation (or, for the first layer, are otherwise based on the network input) and thus are determined at runtime. Thus, the weight memory 705 is typically larger than the activation memory 710 (e.g., 512 KB to 64 KB), as the activation memory is overwritten for each new computation while the weight memory 705 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/−1). In other embodiments, the weights are encoded in such a manner that less than 1 bit of the weight memory #0305 is allocated per weight value (e.g., by encoding the weight values in such a way that many of the zeros are removed).

The weight controller 715 reads data from the weight memory 705 into sets of filter slice buffers 720 and 722 that store the weight values to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load 36 weight values into each filter slice buffer, which are actually used to compute 144 dot product components (with the requirement that at least 75% of the weight values be zero, the actual adder tree only receives 36 inputs for 144 activation values, as described in detail in related U.S. patent application Ser. No. 16/212,643).

Some embodiments include both primary filter slice buffers 720 and secondary filter slice buffers 722, as shown in this figure. In a given clock cycle, at most one of these sets of filter slice buffers is used to compute dot products (e.g., using multiplexers to select only one of the sets of weight values). For simpler dot product computations, only the primary filter slice buffer 720 is needed, so there is no need to load weight values into the secondary filter slice buffers 722. However, in other cases, both sets of filter slice buffers may be used, as described related U.S. patent application Ser. No. 16/212,643.

The activation controller 725 reads data (input values) from the activation memory 710 into the activation window buffers 730 and 732. In addition, the activation controller 725 arranges the input values within the activation window buffer 730 in some embodiments to match up with the weight values in the filters. In some embodiments, the input values in an activation window read into the buffer 730 include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffers 730 and a secondary activation window buffer 732. In a given clock cycle, at most one of these sets of activation window buffers is used to compute dot products (e.g., using multiplexers to select only one of the sets of weight values). For simpler dot product computations, only the primary activation window buffer 720 is needed, so there is no need to load activation inputs into the secondary activation window buffer 722. However, in other cases, both activation window buffers may be used, as described in related U.S. patent application Ser. No. 16/212,643.

The adder trees 745 compute the dot products between the weight values in the filter slice buffers 720 and the input values in the activation window buffer 730. The details of these partial dot product computation circuits of some embodiments are described in related U.S. patent application Ser. No. 16/212,643 which claims priority to U.S. Provisional Patent Application 62/773,164 and are hereby incorporated by reference. These adder trees 745 output partial dot products (e.g., 10-bit values) that are provided to the dot product bus, which combines the partial dot products as described above. In some embodiments, the number of filter slice buffers in each of the sets 720 and 722 is equal to the number of adder trees 735, dot product bus lanes, and post-processing units in each segment. Thus, for a typical neural network computation node, the partial dot products computed by the adder trees 735 in multiple cores having a particular index are aggregated by the dot product bus lane with the same index and that aggregated dot product is provided for post-processing to one of the post-processing units with the same index (i.e., the post-processing unit with that index in one of the channel segments).

The core controller 740 configures and coordinates the operation of the memory controllers 715 and 725 in addition to the filter slice buffers 720, activation window buffer 730, and adder trees 735. Furthermore, the core controller 740 receives the input activations and weights from the memory controllers 715 and 725, and loads them into the correct slots in the sets of filter slice buffers 720 and 722 and the activation window buffers 730 and 732 (or directs them to the ALU bus for non-dot product computations). Lastly, when the adder trees 735 output their partial dot product values, the core controller 740 sends these values to the dot product bus in the global channel 745. When the activations are output, the activation write bus carries these values to the core controller 740, which provides them to the activation control 725 to be written to activation memory 710.

To reduce the circuit area and power required for dot product computations (which use the majority of resources for neural network inference), the partial dot product computation circuits (e.g., the adder trees 735) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

As discussed above core memory (e.g., RAM) includes weight memory 705 and activation memory 710 containing the weight and activation values. In some embodiments, the core RAM is built from multiple banks of compiled memory, but the interface is designed such that the core RAM still behaves (with few exceptions) like a single RAM block with 1R1W interface. In some embodiments, the wrapper provided by the bank of compiled memory (an "IP") is instantiated. In some embodiments, the wrapper provides the necessary internal hierarchy in order to enable memory built-in self-test (MBIST) insertion. Memory write assist and redundancy bus, in some embodiments, are tied-off inside the wrapper. In some embodiments, MBIST insertion takes care of controlling the write assist and redundancy interfaces, read latency is 5 cycles, write commit takes 3 cycles, and core RAM can sustain a constant throughput of 1 operation per cycle.

Designing each core RAM to include multiple memory banks allows individual memory banks (or memory unit) to be put to sleep (i.e., not active, but maintaining data stored in the memory bank) to conserve energy. In addition, the compiler, in some embodiments, organizes the data stored in the memory banks such that each memory bank is accessed for particular layers (or operations related to particular layers) and can be put to sleep during the processing of other layers. Putting memory banks to sleep, in some embodiments, is performed through a hardware circuit of the core RAM and is used in addition to a shutdown operation controlled by software (i.e., a compiler or a controller of the integrated circuit).

Figure 8:
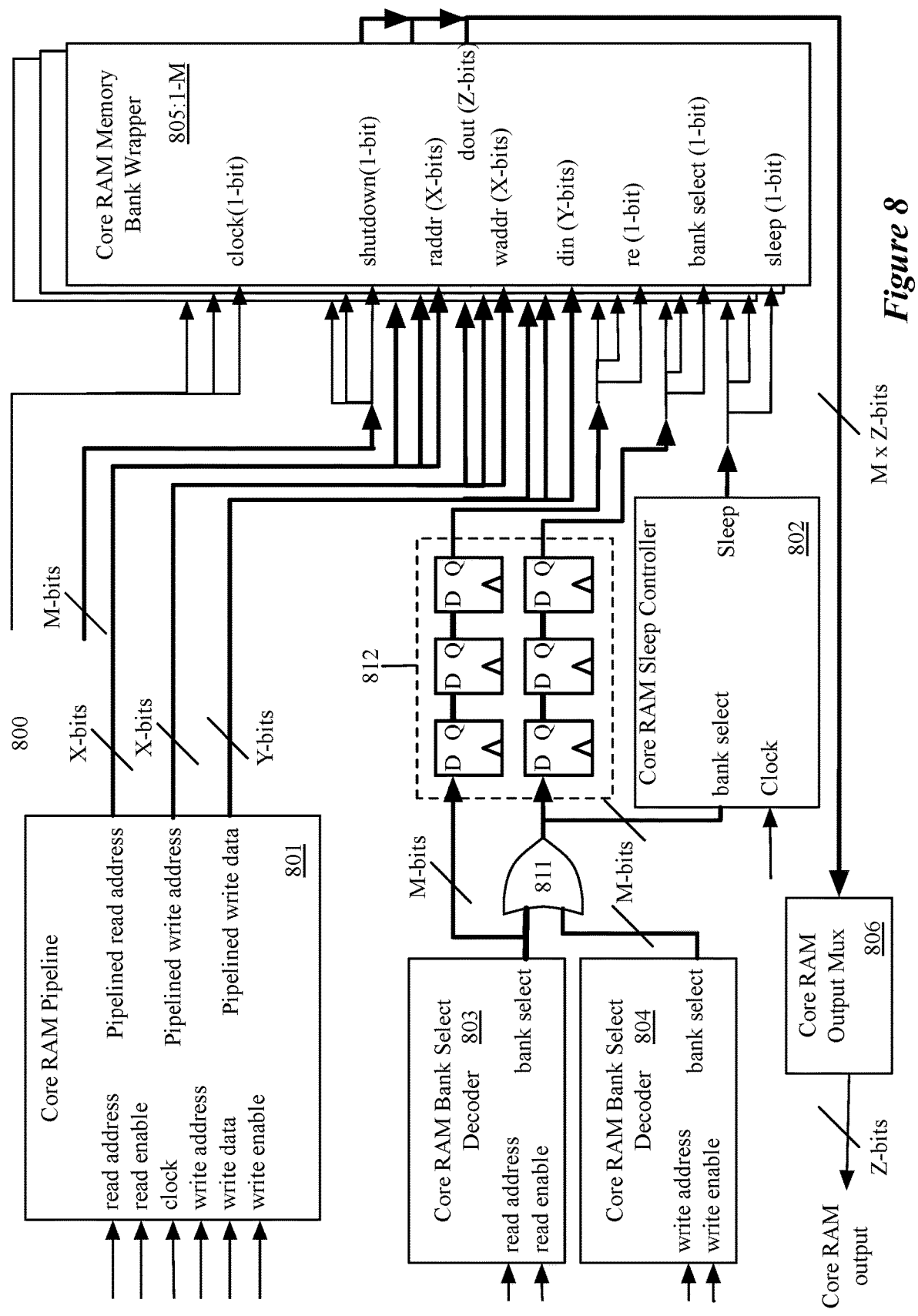
FIG. 8 illustrates components of an embodiment of a core RAM.

FIG. 8 illustrates components of core RAM 800 (e.g., an exemplary embodiment of core RAM 710 of FIG. 7) including a sleep control circuit 802. FIG. 8 includes core RAM pipeline 801, core RAM sleep controller 802, core RAM bank select decoders 803 and 804, core RAM memory bank wrappers 805:1-M (i.e., a set of M (e.g., 12) memory banks), and core RAM output multiplexer (demultiplexer) 806.

Core RAM pipeline 801 accepts input from other components of the integrated circuit. In some embodiments, these inputs include a read address, read enable, write address, write enable, write data, and a clock signal. In other embodiments, additional signals may be received from external sources but are not used for sleep control for the individual banks. Core RAM pipeline 801, in some embodiments, adds latency in order to satisfy the dynamic sleep timing requirements imposed by the memory bank. Details of the core RAM pipeline 801 are discussed below in relation to FIG. 9.

Core RAM bank select decoders 803 and 804 each receive an address for a read operation (i.e., decoder 803) or write operation (i.e., decoder 804) as well as a corresponding enable signal for a read (803) or write (804) operation. The core RAM bank select decoders 803 and 804, in some embodiments, include a decoder that uses a portion of the received address (e.g., the most significant bits (MSB) or least significant bits (LSB)) to determine a memory bank corresponding to the address. In some embodiments the number of bits (either MSB or LSB) that are used to encode the bank selection is based on the number of banks that are included in the core RAM. For example, for a core RAM including 12 memory banks, the 4 MSB (e.g., ceil(log 2(12)) or, in English, the smallest integer larger than log base 2 of the number of memory banks) are used to select the bank based on, for example, a lookup table (LUT) (e.g., implemented as a hardware decoder). In some embodiments, the outputs of the core RAM bank select decoders 803 and 804 are a one-hot zero bus, or one-hot bus with a number of bits equal to the number of banks (e.g., first bit corresponds to, and received by, a first bank, second bit corresponds to, and received by, a second bank, etc.).

In the embodiment shown, the output of the decoders 803 and 804 is supplied to OR gate element 811 to produce an output with "1"s at bits corresponding to banks selected for either a read or write operation (e.g., 001000000010 for a read and write operation for the third and eleventh bank). In some embodiments, the OR gate element 811 is a set of "M" OR gates (e.g., one OR gate per bit of the bank select output) that output a "1" to each bank selected by either a read or write operation. In circuit 800, the OR gate element 811 provides the output to a first sequence of registers in the set of registers 812 that delay the signal to synchronize the signal's arrival at the core RAM memory bank wrapper 805 with the associated address or data signals provided to the core RAM pipeline 801. The output of the OR gate element 811 is split (either before or after the registers 812) so that each bank receives a bit (i.e., either a "0" or "1" signal) associated with that memory bank. In some embodiments, a single bank can only be the subject of either a read or write operation in a single clock cycle, but two different banks can be selected in a single cock cycle to separately be the subject of read and write operations. If both a read and write operation are attempted for a single bank, in some embodiments, the read operation takes precedence as will be apparent from FIGS. 8 and 13, however, in other embodiments, an error (e.g., a compiler error) will result from such conflicting operations.

The output of decoder 803 is also provided to a second sequence of registers (e.g., each register in set 812 representing a set of "M" inputs and outputs, or "M" registers) in the set of registers 812 and is split as described above (e.g., either before or after the registers and providing different bits to different memory banks). In some embodiments, the output from this second sequence of registers is used to distinguish between a read and write operation for a memory bank that receives a "1" bit at the bank select input. Registers 812, in some embodiments, are triggered by a particular transition in a clock value (i.e., a rising or falling edge of a clock signal). As mentioned above, by passing the signal from the OR gate element 811 through a set of edge-triggered registers, the bank select signals are synchronized with the read address, write address, and write data from core RAM pipeline 801 which also go through a series of registers.

The output of the OR gate element 811 is also provided to core RAM sleep controller 802 which determines which banks are to be put to sleep. For example, core RAM sleep controller 802 is configured to send a sleep signal to a particular set of banks after a certain number of cycles in which the bank is not the subject of a read or write operation. The configuration in some embodiments is done at the hardware level, while in other embodiments the configuration includes configuring the value for the number of cycles of not being the subject of a read or write operation before a bank is put to sleep based on software. During each clock cycle core RAM sleep controller 802 sends a signal to the memory banks (units). The signal in some embodiments is an M-bit signal (e.g., using a bus that is M bits wide), where M is the number of memory banks and each bit of the M-bit signal is sent to a different bank. In such embodiments, each of the M bits is independent and the individual banks are put to sleep upon meeting the individual memory bank meeting the sleep criteria (e.g., not being accessed for a particular number of cycles (e.g., 5 or 16 cycles)). The function and structure of core RAM sleep controller 802 is discussed in greater detail in relation to FIG. 10.

Core RAM memory bank wrapper 805 is a thin wrapper around the memory bank. In some embodiments, core RAM memory bank wrapper 805 contains small glue logic needed to combine multiple memory banks into a larger memory. Core RAM memory bank wrapper 805, in some embodiments, is part of a larger wrapper that provides port naming translation to avoid confusion. In such embodiments, the wrapper translates the naming of power saving signals (e.g., powergate and deepsleep signals) of the individual memory banks to more relevant names at the wrapper level (e.g., sleep and shutdown respectively). As shown, core RAM memory bank wrapper 805 (and ultimately the compiled memory IP) receives a clock signal, a shutdown signal (to shut down the memory and lose any stored data), a read address ("raddr") that is a sufficient number of bits to identify all the memory locations in the memory bank (e.g., ceil(log 2(memory locations)) or, in English, the smallest integer larger than log base 2 of the number of memory locations), a write address ("waddr"), a data input ("din") accepting a Y-bit word to be written to a location indicated by "waddr", a read enable indicating that a read has been enabled for the memory bank, a bank select that indicates that the memory bank has been selected for either a read or write operation, and a sleep signal to indicate that the memory bank should be put to sleep (e.g., from core RAM sleep controller 802). Core RAM memory bank wrapper 805 also provides a data output ("dout") signal that is the output of the memory bank (e.g., the result of a read operation) that is Z-bits wide (e.g., the length of memory word). In some embodiments, the number of bits accepted at the "din" port is equivalent to the number of bits output at the "dout" port. Further details of the core RAM memory bank wrapper 805 are discussed with regard to FIG. 13.

Finally, the output of the "dout" port of all the memory banks is passed to the core RAM output multiplexer ("mux") 806. Core RAM output multiplexer ("mux") 806 takes the signals from the multiple banks (all but one of the banks outputting a zero signal) and converts it into a single output signal as expected by other elements of the integrated circuit. In some embodiments, core RAM output multiplexer 806 receives M*Z bits and converts it into a single set of Z bits corresponding to a word length.

Figure 9:
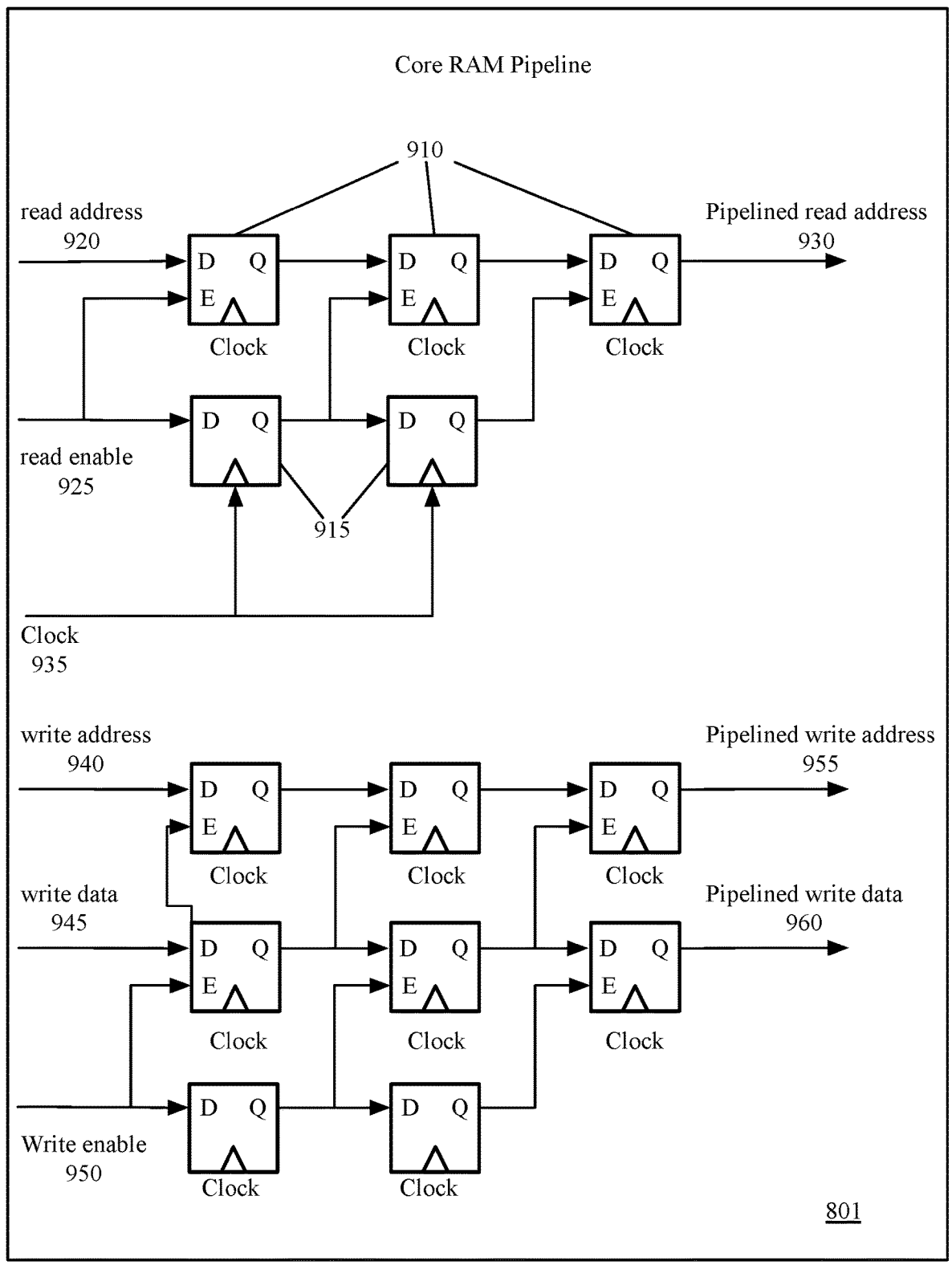
FIG. 9 illustrates components of an embodiment of a core RAM pipeline.

FIG. 9 illustrates components of core RAM pipeline 801. Core RAM pipeline 801 includes a set of registers 910 for each of a read address 920, write address 940, and write data 945, and another set of registers 915 for each of a read enable 925 and write enable 950 signal. In some embodiments, the set of registers 915 for the read (write) enable is implemented as an AND gate with the clock signal 935 and read (write) enable signal as the inputs such that the clock is only provided to the registers 910 when the read (write) enable signal is a "1" indicating that a read (write) has been enabled. In such embodiments, additional power is conserved by gating the clock signal such that each register only receives a clock signal when a read or write has been enabled, such that the register is not triggered when no read or write signal has been enabled. Registers 910 include an input for both a read/write address (or write data) and a read/write enable, such that the other read/write address (or write data) is not passed to the next register unless the read/write enable indicates that a read or write has been enabled in order to conserve power. Registers 915 accept a read/write enable signal and output that signal based on a common clock signal 935 (i.e., with rising edge, falling edge, etc.). In some embodiments, registers 915 are not included and the read/write address (or write data) is passed to each register 910.

A common clock signal 935 is used by the registers to synchronize and delay the read/write address (and write data) to provide additional latency to satisfy the dynamic sleep timing requirements imposed by the memory bank (i.e., allowing memory banks to be woken from a sleeping state before receiving the read/write address (and write data)). As will be discussed below in relation to core RAM sleep controller 802, the sleep signal (e.g., a "0" value indicating no sleep) is passed to the memory bank with fewer registers (e.g., 1 or 0 registers) such that that the memory bank receives the signal earlier and is given a number of cycles to come out of a sleep state (e.g., a number of cycles equivalent to the difference in the number of registers in the paths through the core RAM pipeline 801 and core RAM sleep controller 802). The number of registers, in some embodiments, will be greater or fewer based on the requirements of the other elements of the integrated circuit.

After processing the read/write address (and write data) through the set of registers, the core RAM pipeline 801 outputs the pipelined read address 930, pipelined write address 955, and the pipelined write data 960 to the core RAM memory bank wrapper 805. As described above, the read and write enable, along with a bank select signal are passed from core RAM bank select decoders 803 and 804 through registers 812 to arrive at the core RAM memory bank wrapper at the same time as their associated read address, write address, and write data.

Figure 10:
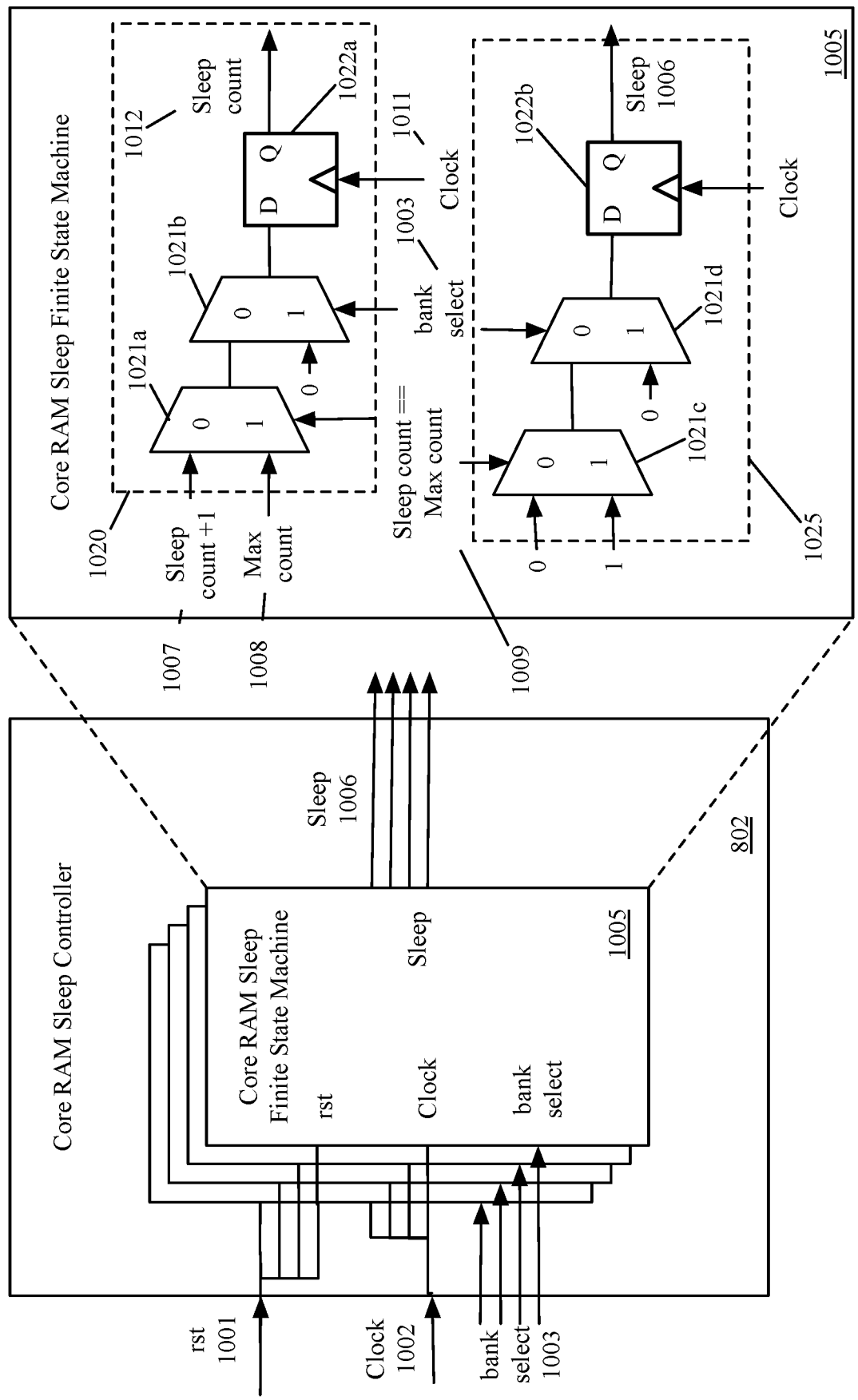
FIG. 10 illustrates components of an embodiment of a core RAM sleep controller.

FIG. 10 illustrates components of core RAM sleep controller 802. As depicted, core RAM sleep controller 802 comprises a set of core RAM sleep controller finite state machines 1005 (e.g., a set of "M" finite state machines for a set of "M" memory banks). Each finite state machine 1005 receives a reset signal 1001 (used to reset the state of the finite state machine when necessary), a clock signal 1002, and a single bit of the bank select signal 1003 (i.e., the particular bit associated with the same memory bank as the particular finite state machine 1005). Clock signal 1002 and bank select signal 1003 are used to increment and/or reset the sleep counter and determine whether a sleep signal indicating that a memory bank should be put to sleep is output by the finite state machine 1005. Additional elements of FIG. 10 will be described in relation to FIGS. 11 and 12. While a person of ordinary skill in the art would understand that there are multiple ways to implement a finite state machine that satisfies the requirements for this application, a particular set of processes and elements are described below so as to provide an exemplary implementation.

Figure 11:
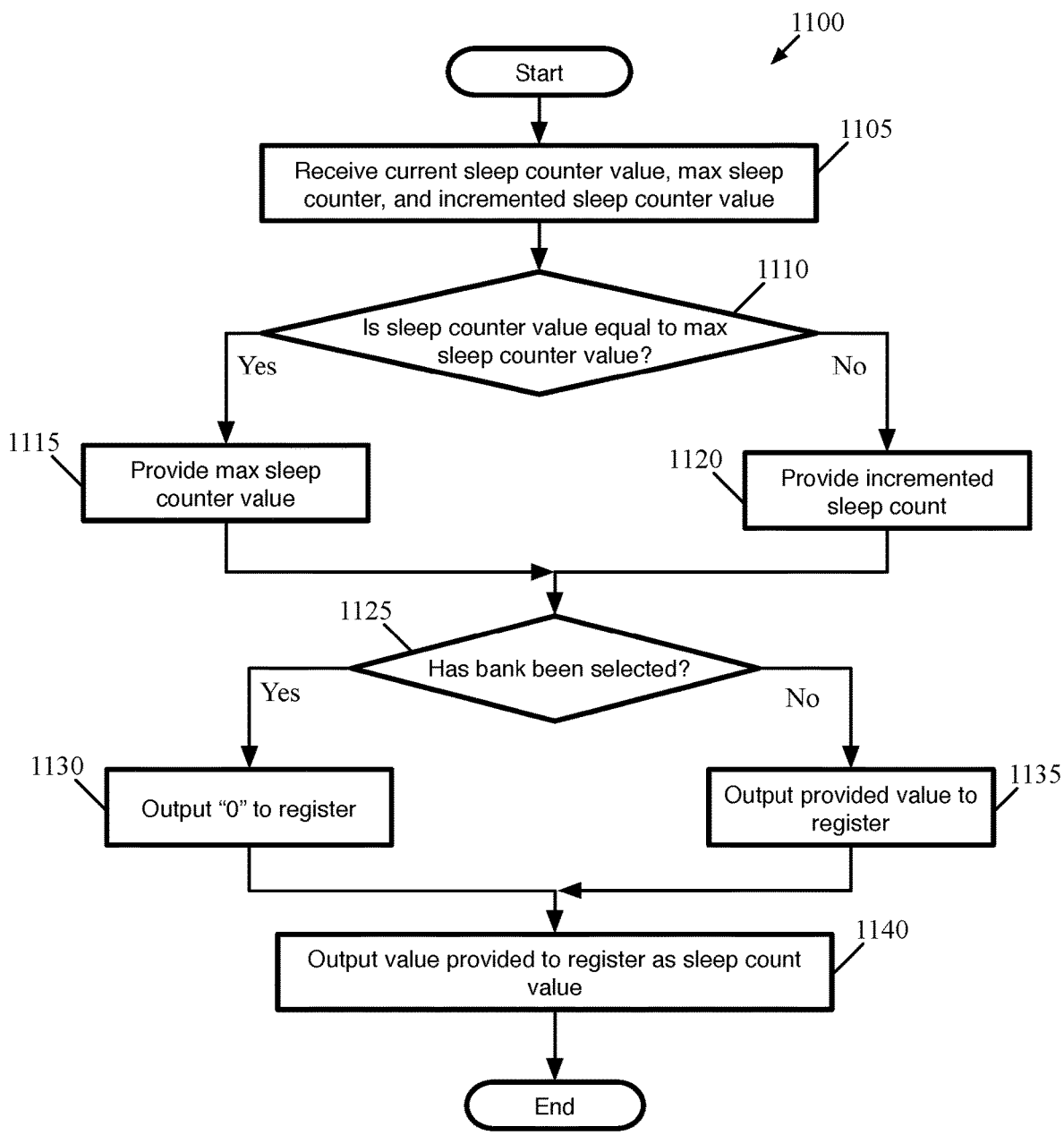
FIG. 11 conceptually illustrates a process for maintaining and updating a sleep count.

FIG. 11 conceptually illustrates a process 1100 for maintaining and updating a sleep count. In some embodiments, process 1100 is performed by group of elements 1020 of FIG. 10 that includes multiplexers 1021c and 1021d and register 1022b. Process 1100 begins by receiving a current sleep counter value, a max sleep counter value, and an incremented sleep counter value. In some embodiments, the sleep counter value is received at a finite state machine (e.g., 1005) from itself in a feedback loop and an incremented sleep counter is generated from the received sleep counter. The max sleep counter, in some embodiments is one of a hardwired value or a configured value based on configuration data (e.g., configuration data provided by a user through a compiler).

Process 1100 continues by comparing (at 1110) the received sleep counter value to the max sleep counter value. In some embodiments, the result of the comparison (e.g., result 1009) is provided to a multiplexer as a selection input (e.g., to a selector pin) to select between the incremented sleep counter value and the max sleep counter value as the output of the multiplexer. For example, multiplexer 1021a receives the incremented sleep counter value 1007 as the "0" input and the max sleep counter value 1008 as the "1" input and the result of the comparison between the incremented sleep counter value and the max sleep counter value 1009 as the selection value.

When the sleep counter is equivalent to the max sleep counter, the max sleep counter value 1008 is provided (at 1115) as the output of the multiplexer to the next multiplexer. When the sleep counter is not equivalent to the max sleep counter, the incremented sleep counter value is provided (at 1120) as the output of the multiplexer to the next multiplexer. For example, multiplexer 1021a outputs the incremented sleep counter value 1007 to multiplexer 1021b when the comparison operation between the sleep counter and max sleep counter produces a "0" value indicating that the sleep counter value has not yet reached the configured value for when to put a memory bank to sleep. Alternatively, multiplexer 1021a outputs the max sleep counter value 1008 to multiplexer 1021b when the comparison operation between the sleep counter and max sleep counter produces a "1" value indicating that the sleep counter value has reached the configured value for when to put a memory bank to sleep.

The process then determines (at 1125) whether the associated memory bank has been selected. In some embodiments, the determination is based on the bank select signal received from the core RAM bank select decoders 803 and 804 through OR gate element 811. In some embodiments, the determination is made implicitly by a multiplexer that receives the associated memory bank select signal as a selection signal. If the multiplexer determines that the bank has not been selected, the multiplexer provides (at 1135) the output of the previous multiplexer provided as the input to the multiplexer (i.e., the incremented sleep counter value 1007 or the max sleep counter value 1008) to a register. If the multiplexer determines that the bank has been selected, the multiplexer provides (at 1130) the "0" provided as the input to the multiplexer to the register.

For example, multiplexer 1021*b* receives (i) a "0" value and (ii) the output provided by multiplexer 1021*a* as the two inputs, and the bank select signal 1003 as the selection signal. If the selection signal 1003 is a "0" value indicating that the associated memory bank has not been selected, the multiplexer 1021*b* outputs the value provided by multiplexer 1021*a* (i.e., either an incremented sleep counter value or a max sleep counter value) to register 1022*a*. If, however, the selection signal 1003 is a "1" value indicating that the associated memory bank has been selected, the multiplexer 1021*b* outputs the "0" value (resetting the counter for how many cycles since the last memory bank access) to register 1022*a*.

Finally, the output value provided by the multiplexer is output (at 1140) by the register as a sleep count value and the process ends. In some embodiments, the register is triggered by a clock signal 1011 that is based on the common clock signal. The output sleep count value provided to the register, in some embodiments, is provided to an input of the finite state machine to be used as the sleep count value for the next clock cycle.

Figure 12:
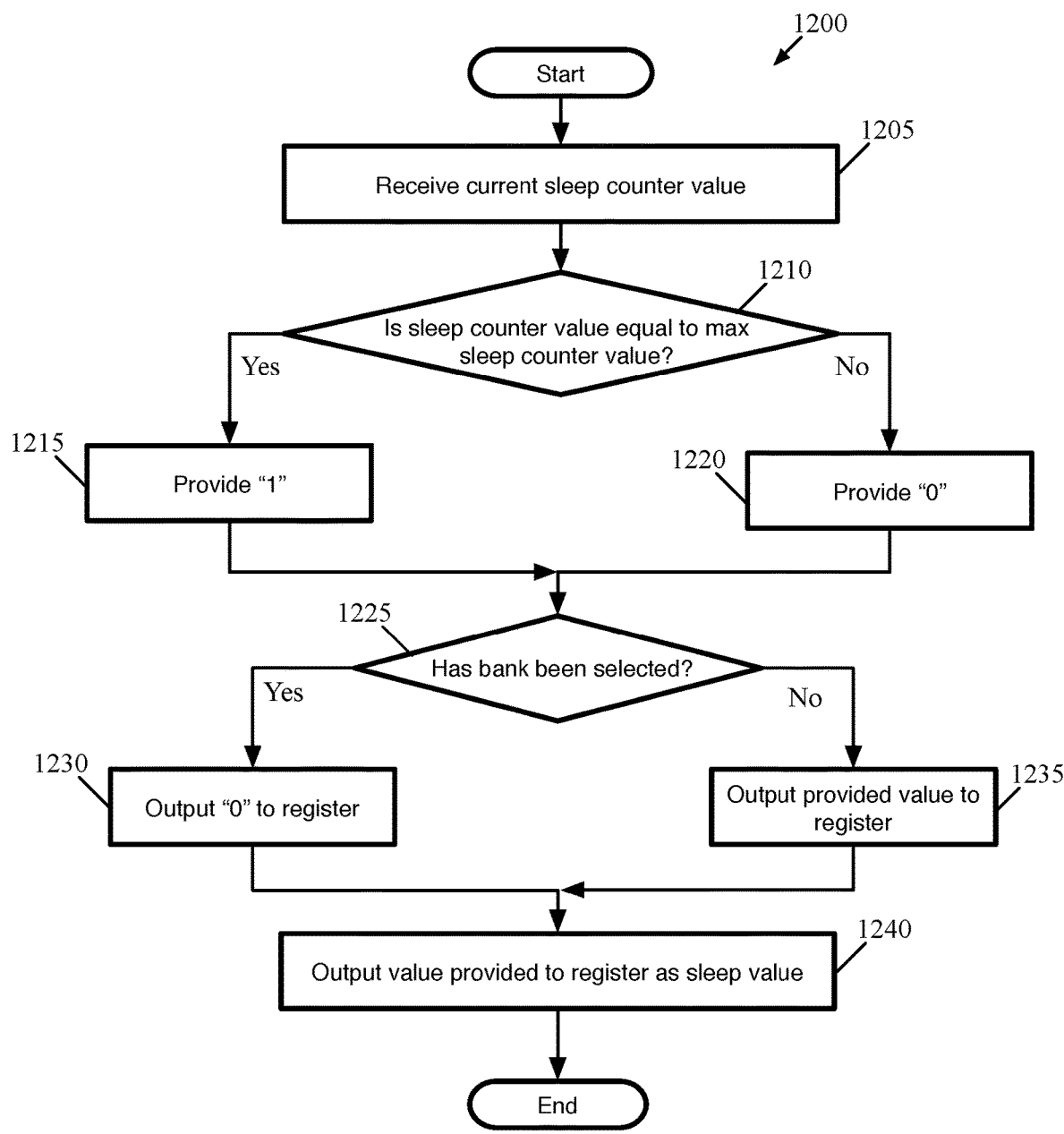
FIG. 12 conceptually illustrates a process for determining whether to output a sleep signal based on a sleep counter value and a bank select signal.

FIG. 12 conceptually illustrates a process 1200 for determining whether to output a sleep signal (i.e., a sleep control signal indicating that the memory bank should enter a sleep mode) based on a sleep counter value and a bank select signal. In some embodiments, process 1200 is performed by group of elements 1025 that includes multiplexers 1021*c* and 1021*d* and register 1022*b*.

Process 1200 begins by receiving (at 1205) a current sleep counter value. As discussed in relation to FIG. 11, the current sleep counter value, in some embodiments, is the output of element group 1020 in a last clock cycle. The sleep counter value represents the number of clock cycles since the last selection of the memory bank associated with the finite state machine receiving (and generating) the sleep counter value.

The process then determines (at 1210) if the received sleep counter value is equal to a max sleep counter value. In some embodiments, finite state machine 1005 performs this determination using a comparator circuit (e.g., an equality comparator) (not shown) and provides the value to multiplexer 1021*c* as a selection signal. If the process determines (at 1210) that the sleep counter value is equal to a max sleep counter value, the process outputs (at 1215) a "1" value to a next multiplexer indicating that the sleep counter value has reached the max sleep counter value that is set for putting the memory bank to sleep. If the process determines (at 1210) that the sleep counter value is not equal to a max sleep counter value, the process outputs (at 1220) a "0" value to a next multiplexer indicating that the sleep counter value has not reached the max sleep counter value that is set for putting the memory bank to sleep. For example, multiplexer 1021*c* selects a particular output value based on a set of input values (e.g., a set including a "1" and "0" value) and the selection signal indicating whether the received sleep counter value is equal to a max sleep counter value (e.g., a "0" value for non-equivalent values and a "1" for equivalent values).

After providing the selected value to the next multiplexer, the multiplexer determines (at 1225) whether the memory bank associated with the finite state machine has been selected. In some embodiments, this determination is made implicitly by a multiplexer that receives the bank select signal 1003 as a selection signal. If the process determines (at 1225) that the memory bank associated with the finite state machine 1005 has been selected, the process outputs a "0" value to a register to indicate that the memory bank should not be put to sleep. However, if the process determines (at 1225) that the memory bank associated with the finite state machine 1005 has not been selected, the process outputs a "1" value provided by the previous multiplexer (e.g., when the sleep counter has reached the threshold value for putting the memory bank to sleep) and outputs a "0" value provided by the previous multiplexer (e.g., when the sleep counter has not yet reached the threshold value for putting the memory bank to sleep) to a register to indicate whether the memory bank should be put to sleep based on the sleep counter.

Finally, the register outputs (at 1240) the value provided to the register as a sleep value and the process ends. In the example of finite state machine 1005, a value of "0" indicates that a memory bank should not sleep, while a sleep value of "1" indicates that the memory ban should sleep. By performing processes 1100 and 1200, a finite state machine keeps track of the number of cycles that a memory bank has not been selected and outputs a sleep signal (command) to a memory bank when it has been idle for a configured number of cycles (e.g., 5 or 16). By having only one register in the path from the input of the read/write address and the sleep signal output, the wake (non-sleep) signal precedes the input for a read or write operation by two cycles (in the example system 800 including core RAM pipeline 801 and core RAM sleep controller 802) to give the memory bank enough time to come out of a sleep before receiving the read or write input to perform a read or write operation.

Figure 13:
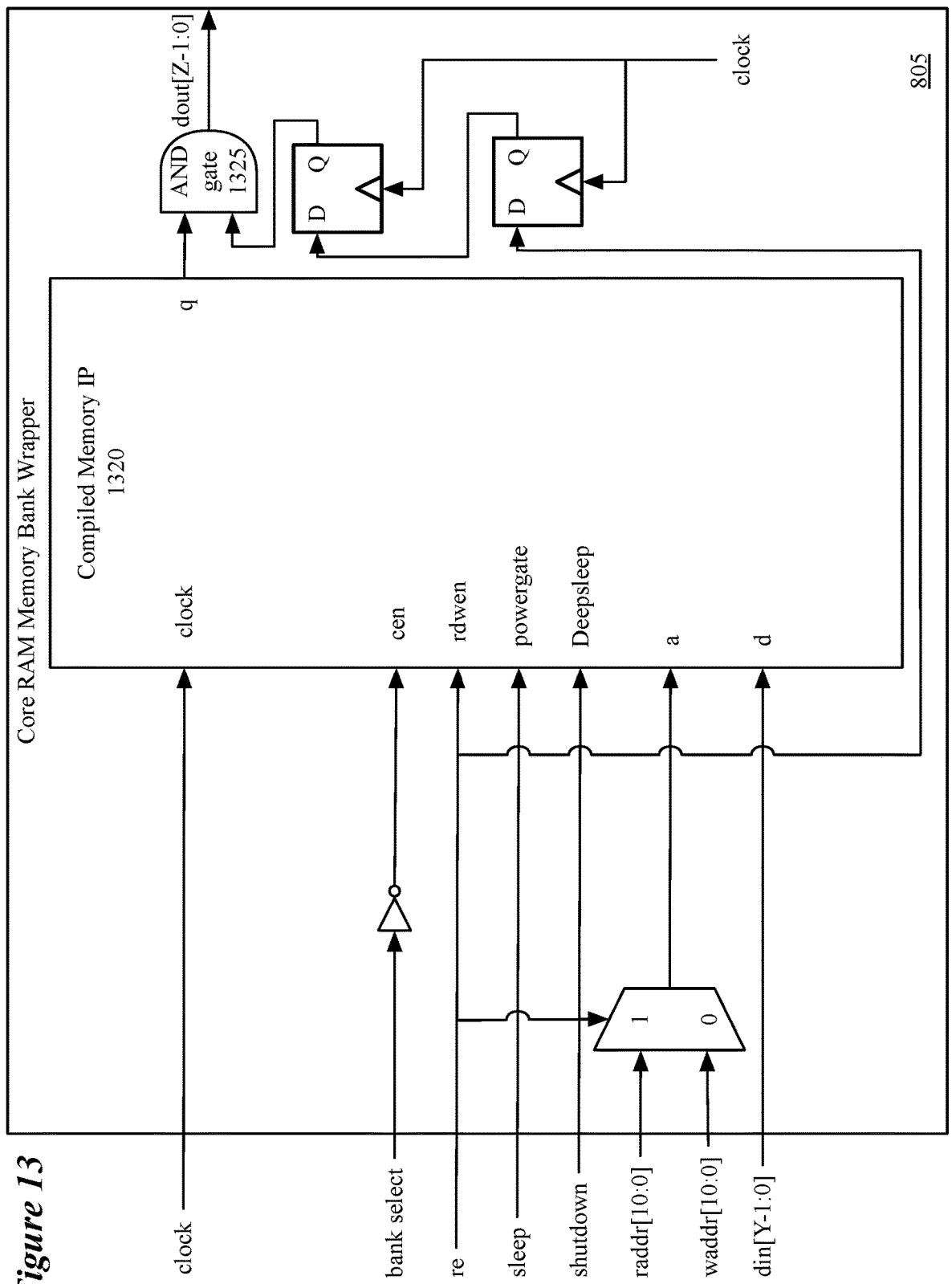
FIG. 13 illustrates components of an embodiment of a core RAM memory bank wrapper.

FIG. 13 illustrates components of core RAM memory bank wrapper 806. Core RAM memory bank wrapper 806 accepts as inputs a clock signal, a bank select signal, a read enable signal, a sleep signal, a shutdown signal, a read address, a write address, and a data input (din) signal. Core RAM memory bank wrapper 805, in some embodiments, includes a clock gating cell (not shown) which, in some embodiments, is a simple cell that includes one NAND gate and one AND gate that is from a standard library of circuit elements. A clock gating cell is responsible for disabling the clock signal whenever the memory IP 1320 enters sleep mode (e.g., receives a sleep value of "1" indicating that it should enter sleep mode). Additionally, the Core RAM memory bank wrapper 805 converts the inputs from other elements of the integrated circuit (e.g., through the core RAM pipeline 801, core RAM bank select decoders 803 and 804, and core RAM sleep controller 802) into inputs for the compiled memory IP (memory bank) 1320. In some embodiments, the core wrapper does not reflect hardware, but instead is merely an abstraction for the purposes of normalizing terminology. In such embodiments, functionality of the core wrapper such as clock gating and output queueing is performed by independent circuits.

For example, core RAM memory bank wrapper 805 passes a sleep signal to a "powergate" input that is used to put the memory IP (memory bank) 1320 into sleep mode and passes a shutdown signal to a "deepsleep" input that is used to power down the memory bank for further power savings when the information stored in the memory bank is no longer necessary. A chip enable input ("cen") receives the inverse of the bank select signal and the read enable signal received at the "rdwen" input is used to distinguish between a read and write operation. Additionally, the core RAM memory bank wrapper 805 includes a multiplexer to select (based on a read enable signal) between a read and write address provided to core RAM memory bank wrapper 805 to use for an address ("a") input of the compiled memory IP 1320. Core RAM memory bank wrapper 805 also uses the read enable signal (e.g., as an input to an AND gate 1325 or set of AND gates) to control whether data output to the other input of the AND gate (or set of AND gates) 1325 is output to core RAM output multiplexer 806 or whether the output includes only "0" s.

Figure 14:
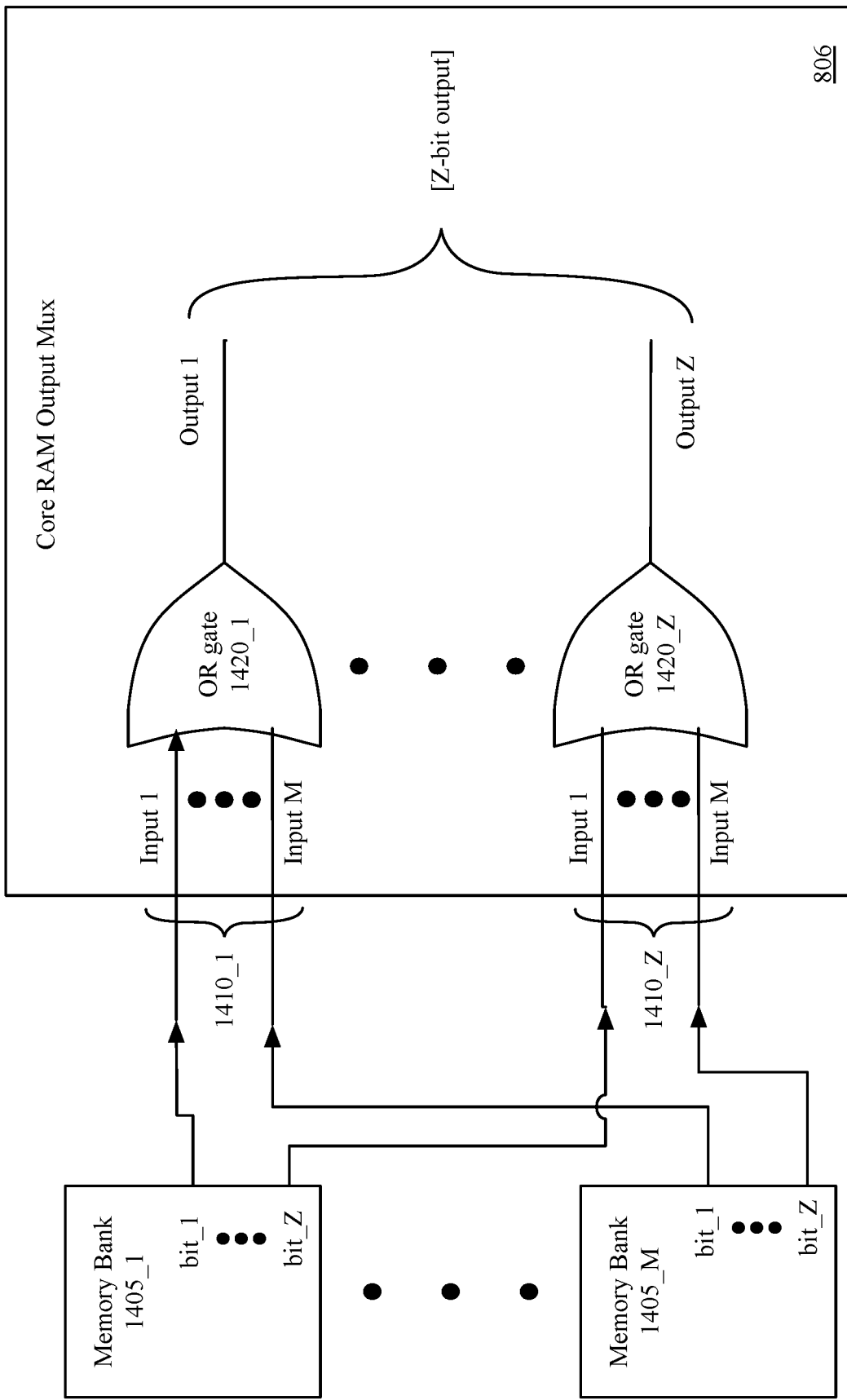
FIG. 14 illustrates components of an embodiment of a core RAM output multiplexer.

The last element of system 800 of FIG. 8 is a core RAM output multiplexer 806. Core RAM output multiplexer 806 receives the output of the M memory banks (i.e., M times Z-bits) and outputs the Z-bit output of the memory bank that was selected for a read operation. FIG. 14 illustrates components of an embodiment of core RAM output multiplexer 806. Core RAM output multiplexer 806 includes a set of Z OR gates 1420 that output a "1" signal for a particular corresponding bit if any of the memory banks have output a "1" signal. Because any memory bank not receiving a read enable signal produces a set of "0" bits based on AND gate element 1325, the signal from the selected memory bank for a read operation is produced by the set of OR gates 1420 of core RAM output multiplexer 806. Core RAM output multiplexer 806 then outputs the Z-bits read from the selected memory bank as the output of system 800 to the next element of the integrated circuit. In some embodiments the output is stored in one of memory controllers 715 and 725 for use as described in relation to FIG. 7 and as described in related U.S. patent application Ser. No. 16/212,643 which claims priority to U.S. Provisional Patent Application 62/773,164 which are hereby incorporated by reference.

Figure 15:
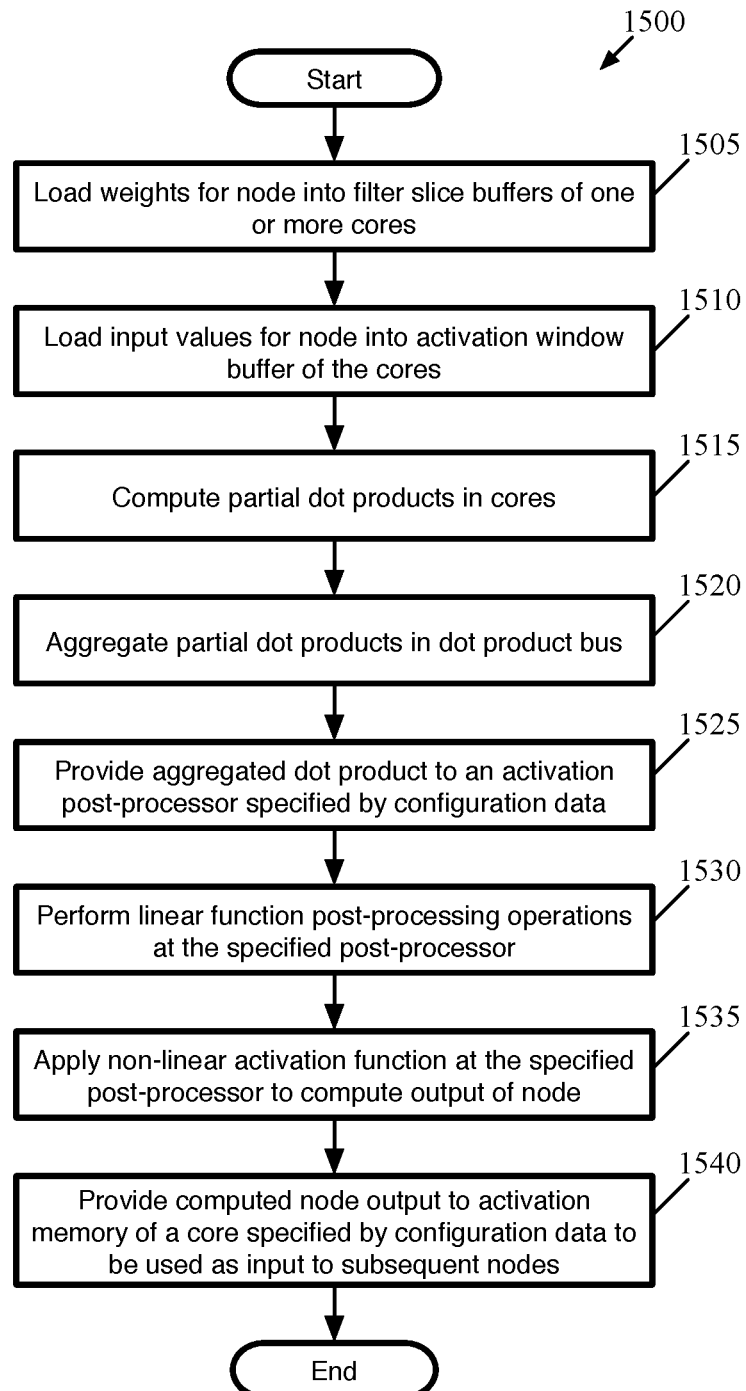
FIG. 15 conceptually illustrates a process of some embodiments for executing a set of instructions (or a portion of a set of instructions) to compute the output of a neural network node.

FIG. 15 conceptually illustrates a process 1500 of some embodiments for executing a set of instructions (or a portion of a set of instructions) to compute the output of a neural network node (specifically, a convolutional or fully-connected node). The process 1500 is executed by the chip fabric of a neural network IC, such as that described above and in related U.S. patent application Ser. No. 16/212,643. Typically, the process 1500 is executed simultaneously for multiple nodes, and will be performed repeatedly for multiple activation windows (i.e., multiple groups of input values loaded into the activation slice buffer) in order to completely execute a layer of the neural network. In the case of the process 1500, the dot product can be computed in a single cycle and does not involve any split filter slices. Additional processes are described in related U.S. patent application Ser. No. 16/212,643 for nodes that involve large dot products, larger input values, or split filters.

As shown, the process begins (at 1505) by loading the weights for a node into filter slice buffers of one or more cores. In addition, the process loads (at 1510) the input (activation) values for the node into the activation window buffer of these cores. In some embodiments, a set of input values are loaded into one activation window buffer in a core while the weight values for several nodes are loaded into several filter slice buffers of the core. Other embodiments load the weight values into the filter slice buffers first, then load the input values into the activation window buffer. Furthermore, some embodiments load the weight values once for a pass (that computes outputs for many activation nodes), then iteratively load sets of input values and compute dot products for numerous nodes without the need to re-load the weights. In addition, the weights and activations for a node, in some embodiments, are divided among the filter slice buffers of all of the cores that are active for the current set of instructions.

The process 1500 then computes (at 1515) partial dot products in the cores. As described above by reference to FIG. 7, the activation values loaded into the activation slice buffers in each of the active cores are multiplied by their corresponding weight values loaded into the filter slice buffers of these cores.

Next, the process aggregates (at 1520) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1500 then provides (at 1525) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1500 performs (at 1530) linear function post-processing operations. For all dot products, this includes bias and scale operations, with the values for these operations sent as configuration data from the cluster controller. In addition, as described below, certain dot products are aggregated over multiple cycles by a dot product input processing circuit (e.g., if time-multiplexing is required to handle dot products with a large number of components, or for dot products with double the standard number of bits).

Next, the process 1500 applies (at 1535) the non-linear activation function at the post-processing unit to complete the calculation of the node output value. In some embodiments, a lookup table is used for this computation (e.g., a 5-bit to 4-bit mapping table). The mapping for each possible set of input bits is provided by configuration data from the cluster controller in some embodiments.

In some embodiments, the operations 1515-1535 are executed to compute the node output without storing the any intermediate values in memory. That is, none of the partial dot products are stored in any memories (e.g., RAM) during the computation within the core, and the same is true before and during the aggregation within the dot product bus. As described below, in some embodiments a register is used to aggregate multiple dot product bus inputs. However, in a standard case (e.g., for 4-bit dot products), the register passes the dot product input through and the entire set of operations 1515-1535 is executed in a single clock cycle.

Finally, the process 1500 provides the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s).

As mentioned, the process 1500 illustrates the most simplistic case for computing the dot product. For this simplest type of dot product computation, the neural network computation circuit of some embodiments places the following restrictions on the computation: (i) all of the input values should be of the specified discrete size (e.g., 4 bits), (ii) the maximum number of input values is the size of the input buffer multiplied by the number of cores (e.g., 144 inputs×16 cores=2304 total input values), (iii) all of the weight values are either 0, +a, or −a (and thus can be stored as 0, 1, and −1), and a large enough percentage of the weight values are 0 that the input values with non-zero weight values can each map to a different multiplexer input.

Figure 16:
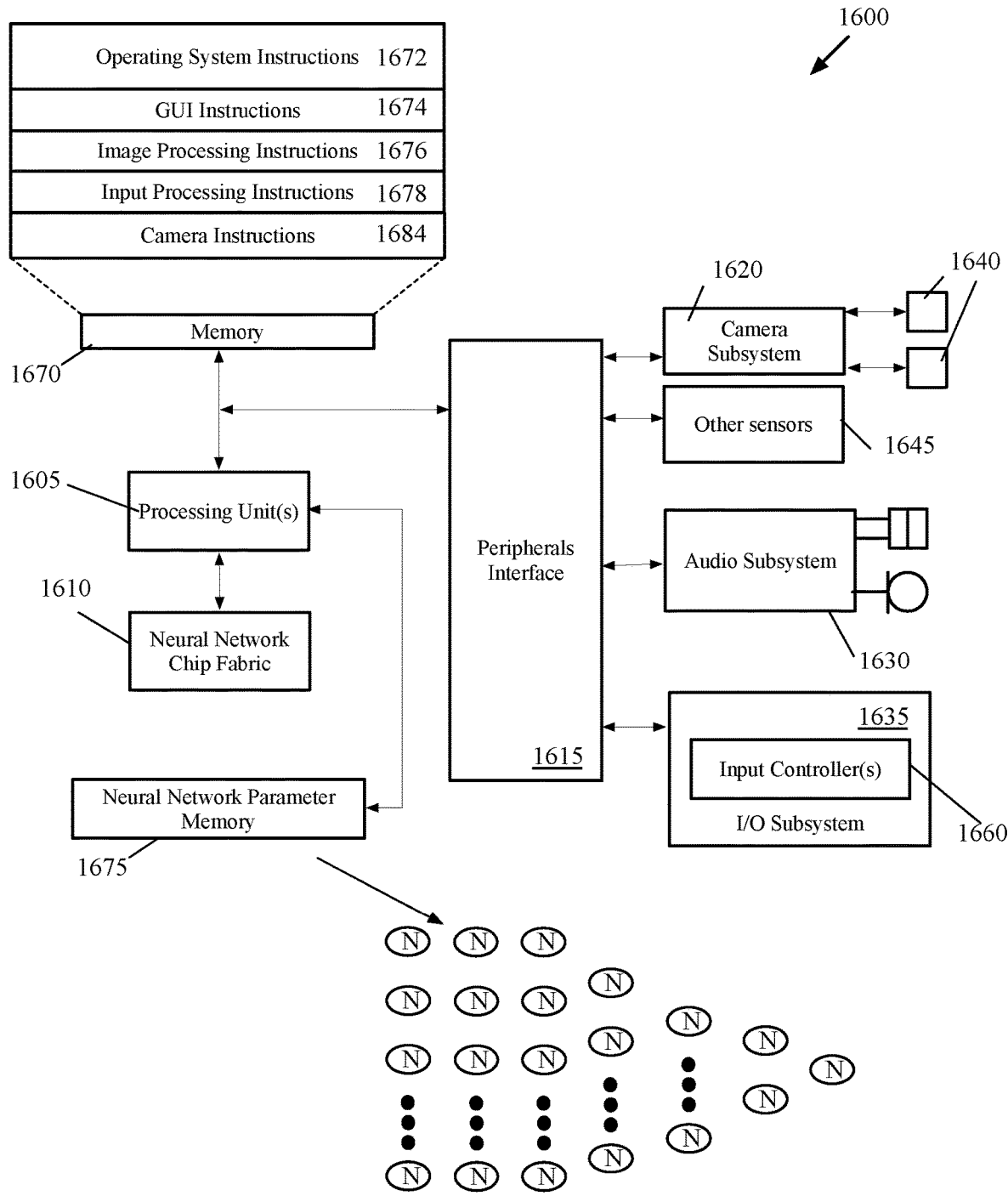
FIG. 16 is an example of an architecture of an electronic device that includes the neural network integrated circuit of some embodiments.

FIG. 16 is an example of an architecture 1600 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 1600 includes one or more general-purpose processing units 1605, a neural network chip fabric 1610, and a peripherals interface 1615.

The peripherals interface 1615 is coupled to various sensors and subsystems, including a camera subsystem 1620, an audio subsystem 1630, an I/O subsystem 1635, and other sensors 1645 (e.g., motion/acceleration sensors), etc. The peripherals interface 1615 enables communication between the processing units 1605 and various peripherals. For example, an orientation sensor (e.g., a gyroscope) and an acceleration sensor (e.g., an accelerometer) can be coupled to the peripherals interface 1615 to facilitate orientation and acceleration functions. The camera subsystem 1620 is coupled to one or more optical sensors 1640 (e.g., charged coupled device (CCD) optical sensors, complementary metal-oxide-semiconductor (CMOS) optical sensors, etc.). The camera subsystem 1620 and the optical sensors 1640 facilitate camera functions, such as image and/or video data capturing.

The audio subsystem 1630 couples with a speaker to output audio (e.g., to output voice navigation instructions). Additionally, the audio subsystem 1630 is coupled to a microphone to facilitate voice-enabled functions, such as voice recognition, digital recording, etc. The I/O subsystem 1635 involves the transfer between input/output peripheral devices, such as a display, a touch screen, etc., and the data bus of the processing units 1605 through the peripherals interface 1615. The I/O subsystem 1635 various input controllers 1660 to facilitate the transfer between input/output peripheral devices and the data bus of the processing units 1605. These input controllers 1660 couple to various input/control devices, such as one or more buttons, a touchscreen, etc.

In some embodiments, the device includes a wireless communication subsystem (not shown in FIG. 16) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 16, a memory 1670 (or set of various physical storages) stores an operating system (OS) 1672. The OS 1672 includes instructions for handling basic system services and for performing hardware dependent tasks. The memory 1670 also stores various sets of instructions, including (1) graphical user interface instructions 1674 to facilitate graphic user interface processing; (2) image processing instructions 1676 to facilitate image-related processing and functions; (3) input processing instructions 1678 to facilitate input-related (e.g., touch input) processes and functions; and (4) camera instructions 1684 to facilitate camera-related processes and functions.

The processing units 1610 execute the instructions stored in the memory 1670 in some embodiments.

The memory 1670 may represent multiple different storages available on the device 1600. In some embodiments, the memory 1670 includes volatile memory (e.g., high-speed random access memory), non-volatile memory (e.g., flash memory), a combination of volatile and non-volatile memory, and/or any other type of memory.

The instructions described above are merely exemplary and the memory 1670 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 1675 stores the weight values, bias parameters, etc. for implementing one or more machine-trained networks by the neural network chip fabric 1610. As mentioned above, different clusters of cores of the fabric 1610 can implement different machine-trained networks in parallel in some embodiments. In different embodiments, these neural network parameters are stored on-chip (i.e., in memory that is part of the neural network chip fabric 1610) or loaded onto the IC 1610 from the neural network parameter memory 1675 via the processing unit(s) 1605.

While the components illustrated in FIG. 16 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 1605 and the neural network IC 1610, which enables the processing units 1605 to provide inputs to the neural network IC 1610 and receive the outputs of the network from the IC 1610. Also, while many of the functions have been described as being performed by one component, one of ordinary skill in the art will realize that the functions described with respect to FIG. 16 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
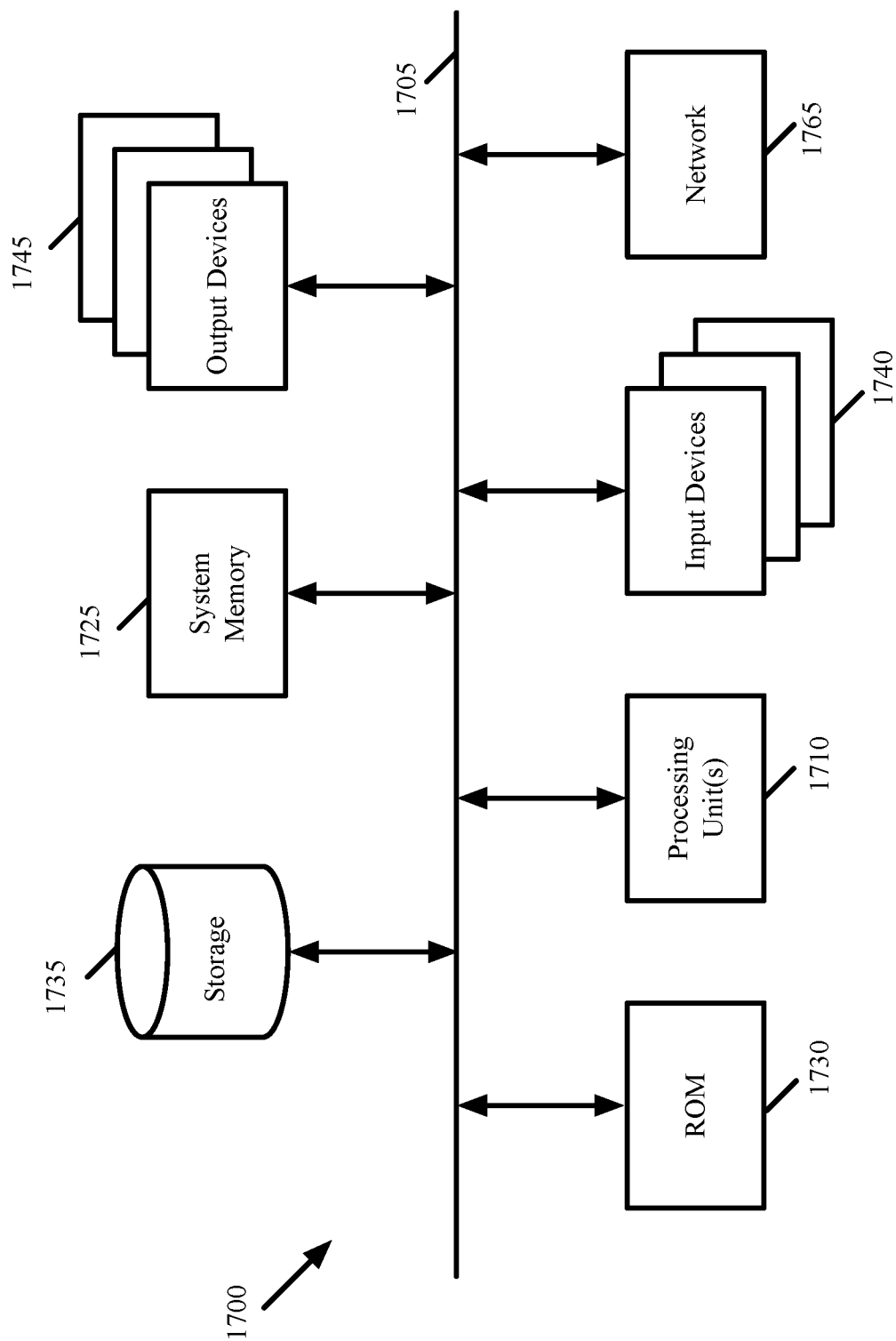
FIG. 17 conceptually illustrates an electronic system with which some embodiments of the invention are implemented.

FIG. 17 conceptually illustrates an electronic system 1700 with which some embodiments of the invention are implemented. The electronic system 1700 can be used to execute any of the control and/or compiler systems described above in some embodiments. The electronic system 1700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1700 includes a bus 1705, processing unit(s) 1710, a system memory 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the system memory 1725, and the permanent storage device 1735.

From these various memory units, the processing unit(s) 1710 retrieves instructions to execute and data to process in order to execute the processes of the invention. The processing unit(s) may be a single processor or a multi-core processor in different embodiments.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device. Like the permanent storage device 1735, the system memory 1725 is a read-and-write memory device. However, unlike storage device 1735, the system memory is a volatile read-and-write memory, such a random-access memory. The system memory stores some of the instructions and data that the processor needs at runtime. In some embodiments, the invention's processes are stored in the system memory 1725, the permanent storage device 1735, and/or the read-only memory 1730. From these various memory units, the processing unit(s) 1710 retrieves instructions to execute and data to process in order to execute the processes of some embodiments.

The bus 1705 also connects to the input and output devices 1740 and 1745. The input devices enable the user to communicate information and select commands to the electronic system. The input devices 1740 include alphanumeric keyboards and pointing devices (also called "cursor control devices"). The output devices 1745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 17, bus 1705 also couples electronic system 1700 to a network 1765 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 11, 12, and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. For a sleep control circuit for a memory unit of a neural network inference circuit configured to execute a neural network, a method comprising:

determining a value indicating a length of time since the memory unit was last accessed, wherein the memory unit stores neural network weight data that is loaded onto the memory unit when the neural network inference circuit is booted up, the weight data for use each time the neural network inference circuit executes the neural network; and when the determined value is at least a threshold value, sending a signal to the memory unit to operate in a sleep mode that is a power-saving mode of operation that maintains the neural network weight data stored in the memory unit.

2. The method of claim 1, wherein the value is determined and the signal sent by a finite state machine of the sleep control circuit.

3. The method of claim 1 further comprising:
after sending the signal to the memory unit to operate in sleep mode, receiving a signal indicating that the memory unit has been selected for one of a read operation and a write operation; and
based on the signal indicating that the memory unit has been selected, sending a signal to the memory unit to operate in non-sleep mode.

4. The method of claim 3 further comprising resetting to zero the value indicating the length of time since the memory unit was last accessed.

5. The method of claim 1, wherein the length of time is a number of clock cycles since the memory unit was last accessed.

6. The method of claim 1, wherein the neural network inference circuit comprises:
a plurality of independently-controlled memory units; and
for each memory unit, a corresponding sleep control circuit.

7. The method of claim 6, wherein each respective sleep control circuit maintains a respective value indicating a length of time since its corresponding memory unit was last accessed.

8. The method of claim 1, wherein the memory unit comprises a first input for the signal to operate in sleep mode and a second input for a shutdown signal that indicates for the memory unit to power down.

9. The method of claim 8, wherein the memory unit maintains data when operating in sleep mode but does not maintain data when powered down.

10. For a sleep control circuit for a memory unit of a neural network inference circuit configured to execute a neural network, a method comprising:
each clock cycle of the neural network inference circuit, determining a value indicating a number of clock cycles since the memory unit was last accessed; and
when the determined value is at least a threshold value, sending a signal to the memory unit to operate in a sleep mode.

11. The method of claim 10, wherein each clock cycle, the sleep control circuit sends one of (i) the signal to operate in sleep mode and (ii) a signal to operate in non-sleep mode.

12. The method of claim 10, wherein the sleep mode is a power-saving mode of operation that maintains data stored in the memory unit.

13. For a sleep control circuit for a memory unit of a neural network inference circuit configured to execute a neural network, a method comprising:
determining a value indicating a length of time since the memory unit was last accessed; and
when the determined value is at least a threshold value, sending a signal to the memory unit to operate in a sleep mode, wherein the neural network inference circuit comprises:
a plurality of independently-controlled memory units;
for each memory unit, a respective corresponding sleep control circuit that maintains a respective value indicating a length of time since its corresponding memory unit was last accessed; and
a memory unit selection decoder circuit that provides, to each of the sleep control circuits, a signal indicating whether the memory unit corresponding to the sleep control circuit is selected for access.

14. The method of claim 13, wherein:
the plurality of memory units are part of a random-access memory (RAM) element of a dot product core of the neural network inference circuit; and
an access to the RAM element indicates (i) a particular one of the memory units to access and (ii) an address in the particular memory unit.

15. The method of claim 14, wherein a signal indicating that the particular memory unit is selected is received at the sleep control circuit for the particular memory unit prior to the particular memory unit receiving input for the memory access.

16. The method of claim 15, wherein the sleep control circuit for the particular memory unit sends a signal to the particular memory unit to operate in non-sleep mode prior to the particular memory unit receiving input for the memory access so that the particular memory unit has fully entered non-sleep mode when the input is received.

17. The method of claim 16, wherein the neural network inference circuit comprises a set of registers that introduce latency into a memory access path.

18. For a sleep control circuit for a memory unit of a neural network inference circuit configured to execute a neural network, a method comprising:
determining a value indicating a length of time since the memory unit was last accessed; and
when the determined value is at least a threshold value, sending a signal to the memory unit to operate in a sleep mode,
wherein the neural network inference circuit comprises a plurality of independently-controlled memory units and, for each memory unit, a corresponding sleep control circuit,
wherein a compiler arranges for storage of weight and activation data in the plurality of memory units in order to conserve power by increasing an amount of time that the memory units operate in sleep mode.

19. The method of claim 18, wherein the sleep mode is a power-saving mode of operation that maintains data stored in the memory unit.

20. The method of claim 19, wherein the memory unit stores neural network weight data that is loaded onto the memory unit when the neural network inference circuit is booted up, the weight data for use each time the neural network inference circuit executes the neural network.

* * * * *